(12) United States Patent
Burke et al.

(10) Patent No.: US 10,726,030 B2
(45) Date of Patent: Jul. 28, 2020

(54) DEFINING EVENT SUBTYPES USING EXAMPLES

(71) Applicant: Splunk Inc., San Francisco, CA (US)

(72) Inventors: Cory Eugene Burke, San Bruno, CA (US); Jacob Barton Leverich, San Francisco, CA (US); Jeffrey Thomas Lloyd, South San Francisco, CA (US); Adam Jamison Oliner, San Francisco, CA (US); Marc Vincent Robichaud, San Francisco, CA (US); Jesse Miller, Piedmont, CA (US)

(73) Assignee: SPLUNK INC., San Francisco, CA (US)

( * ) Notice: Subject to any disclaimer, the term of this patent is extended or adjusted under 35 U.S.C. 154(b) by 136 days.

(21) Appl. No.: 14/815,954

(22) Filed: Jul. 31, 2015

(65) Prior Publication Data

US 2017/0031659 A1 Feb. 2, 2017

(51) Int. Cl.
| | |
|---|---|
| *G06F 16/248* | (2019.01) |
| *G06F 11/30* | (2006.01) |
| *G06F 11/34* | (2006.01) |
| *G06F 16/242* | (2019.01) |
| *G06F 16/245* | (2019.01) |

(52) U.S. Cl.
CPC ........ *G06F 16/248* (2019.01); *G06F 11/3065* (2013.01); *G06F 11/3452* (2013.01); *G06F 16/242* (2019.01); *G06F 16/245* (2019.01)

(58) Field of Classification Search
CPC ........... G06F 17/3087; G06F 17/30893; G06F 17/30867; G06F 17/30289; G06F 17/30424; G06F 3/0482; G06F 17/30011; G06F 17/30864; G06F 17/30321; G06F 17/30595; G06F 17/30286; G06F 16/248; G06F 16/26; G06F 3/04842; G06F 16/972; G06F 19/24; G06F 17/30876; G06F 17/30371; G06F 2216/03; G06F 16/242; G06F 16/245; G06F 11/3065; G06F 11/3452
See application file for complete search history.

(56) References Cited

U.S. PATENT DOCUMENTS

| | | |
|---|---|---|
| 5,550,971 A | 8/1996 | Brunner et al. |
| 7,562,069 B1 | 7/2009 | Pass et al. |
| 8,412,696 B2 | 4/2013 | Zhang et al. |
| 8,429,110 B2 * | 4/2013 | Cai ................... G06F 17/30625 706/45 |
| 8,442,982 B2 | 5/2013 | Jacobson et al. |

(Continued)

OTHER PUBLICATIONS

Geoffrey Webb et al.; Efficient search for associcatio rules; ACM; pp. 99-101; retrieved on Mar. 12, 2020 (Year: 2000).*

(Continued)

*Primary Examiner* — S. Sough
*Assistant Examiner* — Cuong V Luu
(74) *Attorney, Agent, or Firm* — Perkins Coie LLP

(57) ABSTRACT

A facility for defining an event subtype using examples is described. The facility displays events identified among machine-generated data. The facility receives user input selecting a first subset of the events as examples of an event subtype. In response to receiving the user input, the facility displays a second subset of the events predicted to belong to the event subtype on the basis of the examples of the event subtype.

30 Claims, 31 Drawing Sheets

(56) References Cited

U.S. PATENT DOCUMENTS

| | | |
|---|---|---|
| 8,516,008 B1 | 8/2013 | Sorkin et al. |
| 8,589,403 B2 | 11/2013 | Marquardt et al. |
| 8,682,925 B1 | 3/2014 | Marquardt et al. |
| 8,700,658 B2 | 4/2014 | Rambhia et al. |
| 8,713,000 B1 | 4/2014 | Blue et al. |
| 8,738,629 B1 | 5/2014 | Stojanovski et al. |
| 8,751,963 B1 * | 6/2014 | Carasso ............. G06F 16/2477 715/823 |
| 8,788,525 B2 | 7/2014 | Neels et al. |
| 8,788,526 B2 | 7/2014 | Neels et al. |
| 8,826,434 B2 | 9/2014 | Merza |
| 8,983,994 B2 | 3/2015 | Neels et al. |
| 9,031,955 B2 * | 5/2015 | Carasso .................. G06F 7/24 707/736 |
| 9,076,065 B1 * | 7/2015 | Vijayanarasimhan ...................... G06K 9/6256 |
| 9,087,306 B2 * | 7/2015 | Leonard ................. G06F 17/18 |
| 9,124,612 B2 | 9/2015 | Vasan et al. |
| 9,130,971 B2 | 9/2015 | Vasan et al. |
| 9,215,240 B2 | 12/2015 | Merza et al. |
| 9,223,772 B2 * | 12/2015 | Folting ................ G06F 17/246 |
| 9,965,541 B2 * | 5/2018 | Gadamsetty ....... G06F 17/30598 |
| 2002/0054101 A1 | 5/2002 | Beatty et al. |
| 2003/0187821 A1 | 10/2003 | Cotton et al. |
| 2004/0078359 A1 | 4/2004 | Bolognese et al. |
| 2004/0181520 A1 * | 9/2004 | Imaichi ............... G06F 16/3329 |
| 2004/0220965 A1 | 11/2004 | Harville et al. |
| 2004/0225641 A1 | 11/2004 | Dettinger et al. |
| 2005/0203876 A1 | 9/2005 | Cragun et al. |
| 2006/0143159 A1 | 6/2006 | Chowdhury et al. |
| 2006/0253423 A1 | 11/2006 | McLane et al. |
| 2006/0293979 A1 | 12/2006 | Cash et al. |
| 2007/0209080 A1 | 9/2007 | Tu Re et al. |
| 2007/0214164 A1 | 9/2007 | MacLennan et al. |
| 2008/0104542 A1 * | 5/2008 | Cohen ............... G06F 17/30864 715/810 |
| 2008/0222125 A1 | 9/2008 | Chowdhury et al. |
| 2008/0270366 A1 | 10/2008 | Frank et al. |
| 2009/0300065 A1 | 12/2009 | Birchall et al. |
| 2009/0319512 A1 | 12/2009 | Baker et al. |
| 2009/0327319 A1 | 12/2009 | Bertram et al. |
| 2010/0095018 A1 | 4/2010 | Khemani et al. |
| 2010/0251100 A1 | 9/2010 | Delacourt et al. |
| 2010/0306281 A1 | 12/2010 | Williamson et al. |
| 2011/0066585 A1 | 3/2011 | Subrahmanyam et al. |
| 2011/0307436 A1 * | 12/2011 | Cai ....................... G06F 16/951 706/48 |
| 2012/0079363 A1 * | 3/2012 | Folting ................ G06F 17/246 715/227 |
| 2012/0117116 A1 | 5/2012 | Jacobson et al. |
| 2012/0283948 A1 | 11/2012 | Demiryurek et al. |
| 2012/0296876 A1 | 11/2012 | Bacinschi et al. |
| 2013/0041824 A1 | 2/2013 | Gupta et al. |
| 2013/0054642 A1 | 2/2013 | Morin et al. |
| 2013/0060912 A1 | 3/2013 | Rensin et al. |
| 2013/0073957 A1 | 3/2013 | Digiantomasso et al. |
| 2013/0262371 A1 | 10/2013 | Nolan et al. |
| 2013/0318236 A1 | 11/2013 | Coates et al. |
| 2014/0019909 A1 | 1/2014 | Leonard et al. |
| 2014/0046976 A1 | 2/2014 | Zhang et al. |
| 2014/0074887 A1 | 3/2014 | Neels et al. |
| 2014/0160238 A1 | 6/2014 | Yim et al. |
| 2014/0207784 A1 * | 7/2014 | Carasso .................. G06F 7/24 707/739 |
| 2014/0324862 A1 | 10/2014 | Bingham et al. |
| 2015/0019537 A1 | 1/2015 | Lamas et al. |
| 2015/0205510 A1 * | 7/2015 | Hirakata ............... G06F 16/176 715/748 |
| 2016/0246869 A1 * | 8/2016 | Gadamsetty ....... G06F 17/30598 |
| 2017/0011229 A1 * | 1/2017 | Jones-McFadden ......................... G06F 21/6245 |

OTHER PUBLICATIONS

Robert Cattral et al.; Evolutionary Data Mining With Automatic Rule Generalization; semanticscholar; 5 pages; retrieved on Dec. 3, 2020 (Year: 2002).*

Carasso, David, "Exploring Splunk—Search Processing Lanaguage (SPL) Primer and Cookbook," 156 pages, Apr. 2012.

Splunk Inc., "Build a Data Model," Splunk Enterprise 6.1.3 Knowledge Manager Manual, 58 pages, 2014.

Splunk Inc., "Pivot Manual," Splunk Enterprise 6.1.3, 30 pages, 2014.

* cited by examiner

DEFINING EVENT SUBTYPES USING EXAMPLES

BACKGROUND

Modern data centers often comprise thousands of hosts that operate collectively to service requests from even larger numbers of remote clients. During operation, components of these data centers can produce significant volumes of machine-generated data. Some systems for processing and analyzing machine-generated data organize the machine-generated data into "events": actions that each occurred at a particular time, such as actions that each occurred at a particular time on a particular host.

BRIEF DESCRIPTION OF THE DRAWINGS

FIG. 6B illustrates a data summary dialog that enables a user to select various data sources in accordance with the disclosed embodiments.

FIG. 15 shows a display presented by the facility in response to creation of a new subtype as shown in FIG. 14.

DETAILED DESCRIPTION

Figure 1:
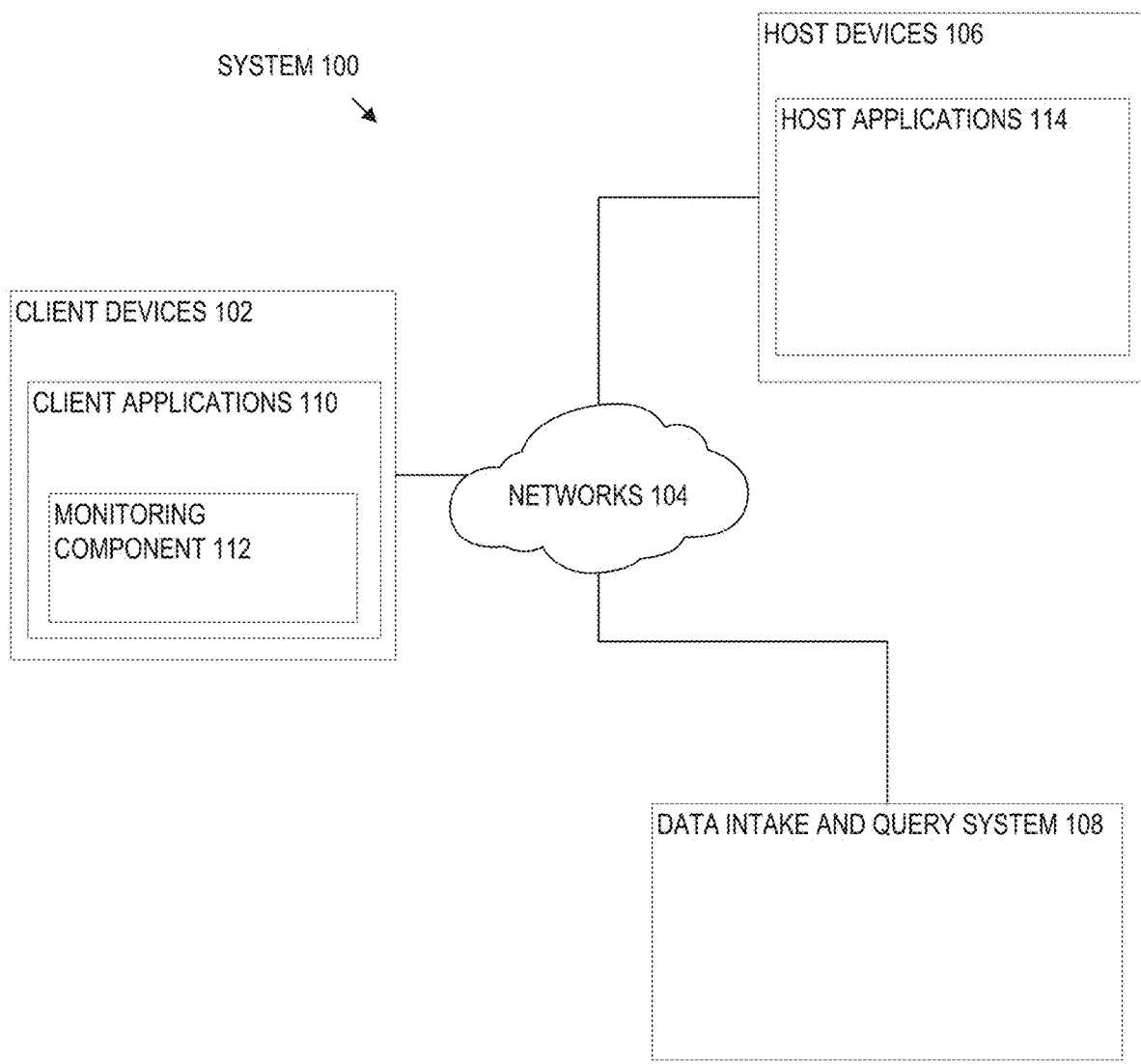
FIG. 1 illustrates a networked computer environment in which an embodiment may be implemented.

The inventors have recognized that the machine-generated data produced by hosts is often heterogeneous to a significant degree; indeed, even the events produced by a single host or a single type of host are significantly heterogeneous. This heterogeneity makes use of this data through indexing and searching much more complex. For example, the inventors have observed that a particular brand and model of firewall host typically produces multiple kinds of events—each of which contains different kinds of information, and each of which is often organized in a different way. This differing organization makes indexing and searching across all of the events produced by such a firewall host complex. Also, in many cases, a human user can benefit from seeing the events from a host containing a particular kind of information, to the exclusion of the other events from the host. For these reasons, the inventors have concluded that tools for selecting particular kinds—or "subtypes"—of machine-generated data events would have significant utility.

The inventors have further recognized that any conventional tools that exist to identify more homogenous machine-generated data tend to be complex and require significant training and experience to use effectively. Accordingly, the inventors have concluded that a straightforward, easy-to-use tool for selecting particular subtypes of machine generated data of events would have especially significant utility.

In order to address these needs, the inventors have conceived and reduced to practice a software and hardware facility for defining event subtypes ("subtypes") using examples ("the facility") is provided. In some cases, the event subtypes defined by the facility are referred to as "event subsets," or simply "subsets."

In some embodiments, the facility displays events, such as events identified among machine-generated data obtained from a particular source or type of source. The facility enables a user to establish one or more subtypes of events from this source. The first step in doing so is to create these subtypes, such as by specifying a name and description for each subtype. For a particular subtype, the user proceeds to identify displayed events that properly belong to the subtype. These are sometimes referred to herein as "positive examples of the subtype." In some embodiments, the user can further identify displayed events that do not properly belong to the subtype. These are sometimes referred to herein as "negative examples of the subtype." Based upon the positive and negative examples selected for a subtype by the user, the facility uses machine-learning techniques to automatically generate a query designed to identify, among a set of events, those events that properly belong to the subtype. In some embodiments, the facility constructs and applies classifying decision trees for this purpose. In some embodiments, the queries automatically generated by the facility specify words, terms, or other text strings that must be present in an event in order for the event to belong to the subtype, and also specifies words, terms, or other text strings that must be absent from an event for the event to not belong to the subtype.

In various embodiments, the facility provides various user input techniques for creating subtypes and selecting events as positive or negative examples of subtypes; generating a query for subtype based upon examples selected for it; displaying events that match a subtype based upon its query; and, where necessary or useful, modifying the examples selected for subtype in order to provide a basis for refining the query automatically generated for it.

In various embodiments, the facility uses visual indications such as colors and/or patterns to indicate events that have been identified as positive examples of a subtype, events that have been identified as negative examples of the subtype, events that match a current query for populating the subtype, events that have no connection to the subtype, etc. In various embodiments, the facility uses visual indications such as colors and/or patterns to identify events that are members of different previously specified subtypes.

Once a user has successfully established an event subtype, the user can associate additional actions with the events that belong to the subtype, such as performing various kinds of pattern matching, or applying other types of extraction rules. Extraction rules that are applied specifically to a subtype can be much less complex than extraction rules that are applied to all of the events generated by a host. This makes such extraction rules significantly easier to construct and understand, and enables execution of these extraction rules complete more quickly and consume fewer processing resources.

In some embodiments, the facility saves event subtypes, enabling them to be applied to any group of events at any time in the future. In some embodiments, the facility enables a subtype defined by one user to be used by other users. In some embodiments, multiple users can contribute to the definition of a subtype by adding and removing positive and negative examples of the subtype.

By behaving in some or all of the ways described above, the facility provides benefits such as: enabling unsophisticated users to easily impose meaningful organization on voluminous unstructured and semi-structured data; performing more effective searching; performing searching operations more quickly, using less computing resources; and performing searching operations using less capable, less expensive hardware.

Embodiments are described herein according to the following detailed specification.
   1.0. General Overview
   2.0. Operating Environment
      2.1. Host Devices
      2.2. Client Devices
      2.3. Client Device Applications
      2.4. Data Server System
      2.5. Data Ingestion
         2.5.1. Input
         2.5.2. Parsing
         2.5.3. Indexing
      2.6. Query Processing
      2.7. Field Extraction
      2.8. Example Search Screen
      2.9. Data Modelling
      2.10. Acceleration Techniques
         2.10.1. Aggregation Technique
         2.10.2. Keyword Index
         2.10.3. High Performance Analytics Store
         2.10.4. Accelerating Report Generation
      2.11. Security Features
      2.12. Data Center Monitoring
      2.13. Cloud-Based System Overview
      2.14. Searching Externally Archived Data
         2.14.1. ERP Process Features
      2.15. Typical Hardware Components
   3.0. Defining Event Subsets

1.0. General Overview

Modern data centers and other computing environments can comprise anywhere from a few host computer systems to thousands of systems configured to process data, service requests from remote clients, and perform numerous other computational tasks. During operation, various components within these computing environments often generate significant volumes of machine-generated data. In general, machine-generated data can include performance data, diagnostic information, and many other types of data that can be analyzed to diagnose performance problems, monitor user interactions, and to derive other insights.

A number of tools are available to analyze machine data, that is, machine-generated data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and is discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may, for example, enable an analyst to investigate different aspects of the machine data that previously were unavailable for analysis.

However, analyzing and searching massive quantities of machine data presents a number of challenges. For example, a data center, servers, or network appliances, may generate many different types and formats of machine data (e.g., system logs, network packet data (e.g., wire data, etc.), sensor data, application program data, error logs, stack traces, system performance data, etc.) from thousands of different components, which can collectively can be very time-consuming to analyze. In another example, mobile devices may generate large amounts of information relating to data accesses, application performance, operating system performance, network performance, etc. The number of mobile devices that report these types of information can number in the millions. Also, the unstructured nature of much of this machine data can pose additional challenges because of the difficulty of applying semantic meaning to unstructured data, and the difficulty of indexing and querying unstructured data using traditional database systems.

These challenges can be addressed by using an event-based data intake and query system, such as the SPLUNK® ENTERPRISE system produced by Splunk Inc. of San Francisco, Calif. The SPLUNK® ENTERPRISE system is the leading platform for providing real-time operational intelligence that enables organizations to collect, index, and search machine-generated data from various websites, applications, servers, networks, and mobile devices that power their businesses. The SPLUNK® ENTERPRISE system is particularly useful for analyzing unstructured data, which is commonly found in system log files, network data, and other data input sources. Although many of the techniques described herein are explained with reference to a data intake and query system similar to the SPLUNK® ENTERPRISE system, the techniques are also applicable to other types of data systems.

In the SPLUNK® ENTERPRISE system, machine-generated data is collected and stored as "events," where each event comprises a portion of the machine-generated data and is associated with a specific point in time. For example, events may be derived from "time series data," where the time series data comprises a sequence of data points (e.g., performance measurements from a computer system, etc.) that are associated with successive points in time. In general, each event can be associated with a timestamp that is derived from the raw data in the event, determined through interpolation between temporally proximate events having known timestamps, determined based on other configurable rules for assigning timestamps to events, etc.

Events can be derived from either "structured" or "unstructured" machine data. In general, structured data has a predefined format, where data items with specific data formats are stored at predefined locations in the data. For example, structured data may include data stored as fields in a database table. In contrast, unstructured data may not have a predefined format, that is, the data is not at fixed, predefined locations, but the data does have repeatable patterns and is not random. This means that unstructured data can comprise various data items of different data types and that may be stored at different locations within the data. For example, when the data source is an operating system log, an event can include one or more lines from the operating system log containing raw data that includes different types of performance and diagnostic information associated with a specific point in time.

Examples of components which may generate machine data from which events can be derived include, but are not limited to, web servers, application servers, databases, firewalls, routers, operating systems, and software applications that execute on computer systems, mobile devices, sensors, etc. The data generated by such data sources can include, for example and without limitation, server log files, activity log files, configuration files, messages, network packet data, performance measurements, sensor measurements, etc.

The SPLUNK® ENTERPRISE system also facilitates using a flexible schema to specify how to extract information from the event data, where the flexible schema may be developed and redefined as needed. Note that a flexible schema may be applied to event data "on the fly," when it is needed (e.g., at search time, etc.), rather than at ingestion time of the data as in traditional database systems. Because the schema is not applied to event data until it is needed (e.g., at search time, etc.), it may be referred to as a "late-binding schema."

During operation, the SPLUNK® ENTERPRISE system starts with raw input data (e.g., one or more system logs, streams of network packet data, sensor data, application program data, error logs, stack traces, system performance data, etc.). The system divides this raw data into blocks (e.g., buckets of data, each associated with a specific time frame, etc.), and parses the raw data to produce timestamped events. The system stores the timestamped events in a data store, and enables users to run queries against the stored data to, for example, retrieve events that meet criteria specified in a query, such as containing certain keywords or having specific values in defined fields. In this context, the term "field" refers to a location in the event data containing a value for a specific data item.

As noted above, the SPLUNK® ENTERPRISE system facilitates applying a late-binding schema to event data while performing queries on events. One aspect of a late-binding schema is "extraction rules" that are applied to data in the events to extract values for specific fields. More specifically, the extraction rules for a field can include one or more instructions that specify how to extract a value for the field from the event data. An extraction rule can generally include any type of instruction for extracting values from data in events. In some cases, an extraction rule comprises a regular expression where a sequence of characters form a search pattern, in which case the rule is referred to as a "regex rule." The system applies the regex rule to the event data in order to identify where the associated field occurs in the event data by searching the event data for the sequence of characters defined in the regex rule.

In the SPLUNK® ENTERPRISE system, a field extractor may be configured to automatically generate extraction rules for certain fields in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as an analyst learns more about the data in the events, the analyst can continue to refine the late-binding schema by adding new fields, deleting fields, or modifying the field extraction rules for use the next time the schema is used by the system. Because the SPLUNK® ENTERPRISE system maintains the underlying raw data and uses late-binding schemas for searching the raw data, it enables an analyst to investigate questions that arise as the analyst learns more about the events.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by disparate data sources, the system facilitates use of a "common information model" (CIM) across the disparate data sources.

2.0. Operating Environment

FIG. 1 illustrates a networked computer system 100 in which an embodiment may be implemented. FIG. 1 represents an example embodiment that is provided for purposes of illustrating a clear example; other embodiments may use different arrangements.

The networked computer system 100 comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In an embodiment, one or more client devices 102 are coupled to one or more host devices 106 and a data intake and query system 108 via one or more networks 104. Networks 104 broadly represent one or more LANs, WANs, cellular networks (e.g., LTE, HSPA, 3G, and other cellular technologies), and/or internetworks using any of wired, wireless, terrestrial microwave, or satellite links, and may include the public Internet.

2.1. Host Devices

In an embodiment, a system 100 includes one or more host devices 106. Host devices 106 may broadly include any number of computers, virtual machine instances, and/or data centers that are configured to host or execute one or more instances of host applications 114. In general, a host device 106 may be involved, directly or indirectly, in processing requests received from client devices 102. For example, each host device 106 may comprise, for example, one or more of a network device, a web server, an application server, a database server, etc. A collection of host devices 106 may be configured to implement a network-based service. For example, a provider of a network-based service may configure one or more host devices 106 and host applications 114 (e.g., one or more web servers, application servers, database servers, etc.) to collectively implement the network-based application.

In general, client devices 102 communicate with one or more host applications 114 to exchange information. The communication between a client device 102 and a host application 114 may, for example, be based on the Hypertext Transfer Protocol (HTTP) or any other network protocol. Content delivered from the host application 114 to a client device 102 may include, for example, HTML documents, media content, etc. The communication between a client device 102 and host application 114 may include various request and response packets. For example, in general, a client device 102 may initiate communication with a host application 114 by making a request for a specific resource (e.g., based on an HTTP request), and the application server may respond with the requested content stored in one or more response packets.

In an embodiment, one or more of host applications 114 may generate various types of performance data during operation, including event logs, network data, sensor data, and other types of machine-generated data. For example, a host application 114 comprising a web server may generate one or more web server logs in which details of interactions between the web server and any number of client devices 102 is recorded. As another example, a host device 106 comprising a router may generate one or more router logs that record information related to network traffic managed by the router. As yet another example, a host application 114 comprising database server may generate one or more logs that record information related to requests sent from other host applications 114 (e.g., web servers or application servers) for data managed by the database server.

2.2. Client Devices

Client devices 102 of FIG. 1 broadly represent any computing device capable of interacting with one or more host devices 106 via a network 104. Examples of client devices 102 may include, without limitation, smart phones, tablet computers, other handheld computers, wearable devices, laptop computers, desktop computers, servers, portable media players, gaming devices, and so forth. In general, a client device 102 can provide access to different content, for instance, content provided by one or more host devices 106. Each client device 102 may comprise one or more client applications 110, described in more detail in a separate section hereinafter.

2.3. Client Device Applications

In an embodiment, each client device 102 may host or execute one or more client applications 110 that are capable of interacting with one or more host devices 106 via one or more networks 104. For instance, a client application 110 may be or comprise a web browser which a user may navigate to one or more websites or other resources provided by one or more host devices 106. As another example, a client application 110 may comprise a mobile application or "app." For example, an operator of a network-based service hosted by one or more host devices 106 may make available one or more mobile apps that enable users of client devices 102 to access various resources of the network-based service. As yet another example, client applications 110 may include background processes that perform various operations without direct interaction from a user. A client application 110 may include a "plug-in" or "extension" to another application, such as a web browser plug-in or extension.

In an embodiment, a client application 110 may include a monitoring component 112. At a high level, the monitoring component 112 comprises a software component or other logic that facilitates generating performance data related to a client device's operating state, including monitoring network traffic sent and received from the client device and collecting other device and/or application-specific information. Monitoring component 112 may be an integrated component of a client application 110, a plug-in, an extension, or any other type of add-on to the application. Monitoring component 112 may also be a stand-alone process.

In one embodiment, a monitoring component 112 may be created when a client application 110 is initially developed, for example, by an application developer using a software development kit (SDK). The SDK may, for example, include custom monitoring code that can be incorporated into the code implementing a client application 110. When the code is converted to an executable application, the custom code implementing the monitoring functionality can become part of the application itself.

In some cases, an SDK or other code for implementing the monitoring functionality may be offered by a provider of a data intake and query system, such as a system 108. In such cases, the provider of the system 108 can implement the custom code such that performance data generated by the monitoring functionality is sent to the system 108 to facilitate analysis of the performance data by a developer of the client application or other users.

In an embodiment, the custom monitoring code may be incorporated into the code of a client application 110 in a number of different ways, such as the insertion of one or more lines in the client application code that call or otherwise invoke the monitoring component 112. As such, a developer of a client application 110 can add one or more lines of code into the client application 110 to trigger the monitoring component 112 at desired points during execution of the application. Code that triggers the monitoring component may be referred to as a monitor trigger. For instance, a monitor trigger may be included at or near the beginning of the executable code of the client application 110 such that the monitoring component 112 is initiated or triggered as the application is launched, or included at other points in the code that correspond to various actions of the client application, such as sending a network request or displaying a particular interface.

In an embodiment, the monitoring component 112 may monitor one or more aspects of network traffic sent and/or received by a client application 110. For example, the monitoring component 112 may be configured to monitor data packets transmitted to and/or from one or more host applications 114. Incoming and/or outgoing data packets can be read or examined to identify network data contained within the packets, for example, and other aspects of data packets can be analyzed to determine a number of network performance statistics. Monitoring network traffic may enable information to be gathered particular to the network performance associated with a client application 110 or set of applications.

In an embodiment, network performance data refers to any type of data that indicates information about the network and/or network performance. Network performance data may include, for instance, a URL requested, a connection type (e.g., HTTP, HTTPS, etc.), a connection start time, a connection end time, an HTTP status code, request length, response length, request headers, response headers, connection status (e.g., completion, response time(s), failure, etc.), and the like. Upon obtaining network performance data indicating performance of the network, the network performance data can be transmitted to a data intake and query system 108 for analysis.

Upon developing a client application 110 that incorporates a monitoring component 112, the client application 110 can be distributed to client devices 102. Applications generally can be distributed to client devices 102 in any manner. In some cases, the application may be distributed to a client device 102 via an application marketplace or other application distribution system. For instance, an application marketplace or other application distribution system might distribute the application to a client device based on a request from the client device to download the application.

Examples of functionality that enables monitoring performance of a client device are described in U.S. patent application Ser. No. 14/524,748, entitled "UTILIZING PACKET HEADERS TO MONITOR NETWORK TRAFFIC IN ASSOCIATION WITH A CLIENT DEVICE", filed on 27 Oct. 2014, and which is hereby incorporated by reference in its entirety for all purposes.

In an embodiment, the monitoring component 112 may also monitor and collect performance data related to one or more aspects of the operational state of a client application 110 and/or client device 102. For example, a monitoring component 112 may be configured to collect device performance information by monitoring one or more client device operations, or by making calls to an operating system and/or one or more other applications executing on a client device 102 for performance information. Device performance information may include, for instance, a current wireless signal strength of the device, a current connection type and network carrier, current memory performance information, a geographic location of the device, a device orientation, and any other information related to the operational state of the client device.

In an embodiment, the monitoring component 112 may also monitor and collect other device profile information including, for example, a type of client device, a manufacturer and model of the device, versions of various software applications installed on the device, and so forth.

In general, a monitoring component 112 may be configured to generate performance data in response to a monitor trigger in the code of a client application 110 or other triggering application event, as described above, and to store the performance data in one or more data records. Each data record, for example, may include a collection of field-value pairs, each field-value pair storing a particular item of performance data in association with a field for the item. For example, a data record generated by a monitoring component 112 may include a "networkLatency" field in which a value is stored indicating a network latency measurement associated with one or more network requests, a "state" field to store a value indicating a state of a network connection, and so forth for any number of aspects of collected performance data.

2.4. Data Server System

Figure 2:
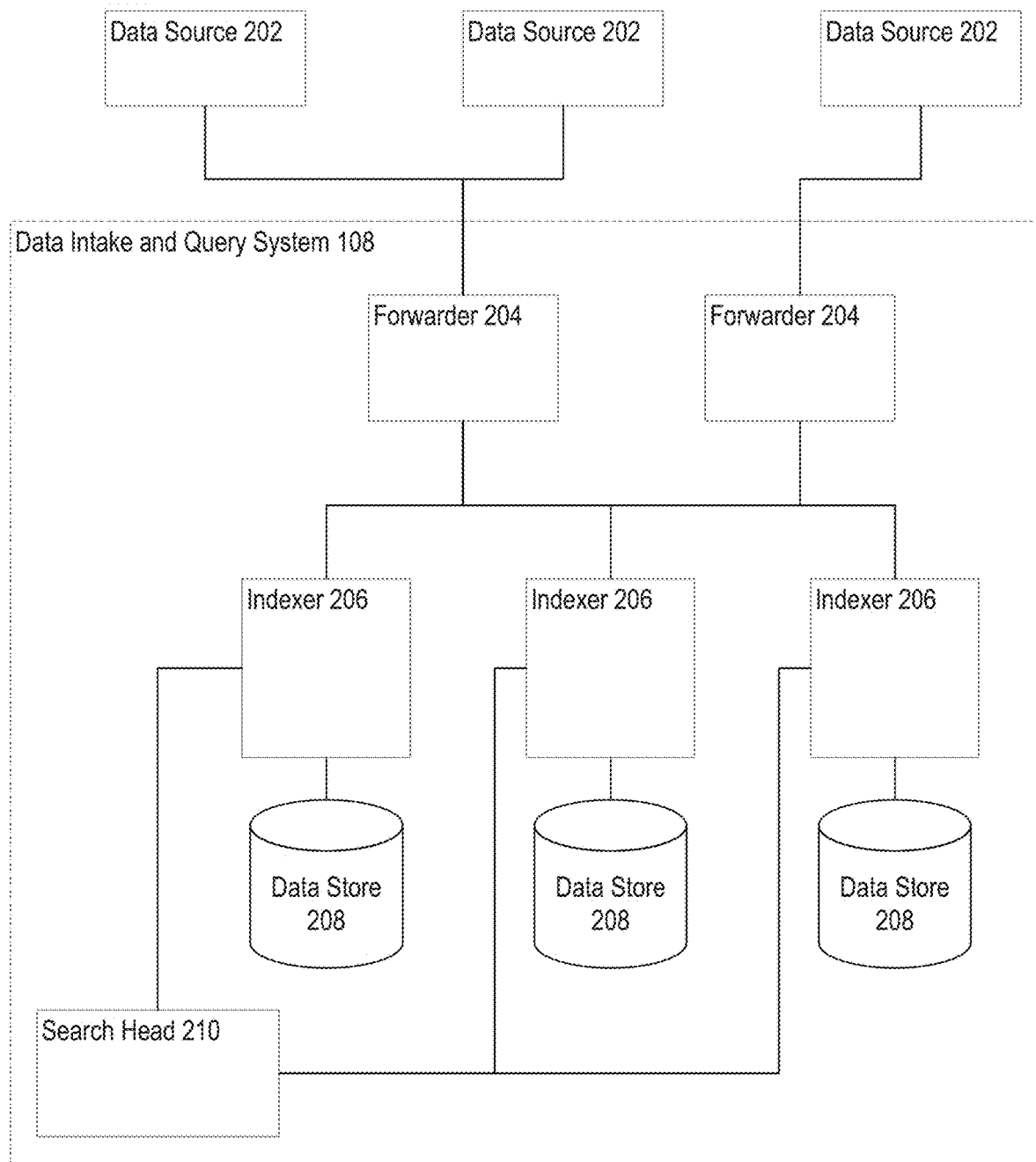
FIG. 2 illustrates a block diagram of an example data intake and query system in which an embodiment may be implemented.

FIG. 2 depicts a block diagram of an example data intake and query system 108, similar to the SPLUNK® ENTERPRISE system. System 108 includes one or more forwarders 204 that consume data from a variety of input data sources 202, and one or more indexers 206 that process and store the data in one or more data stores 208. These forwarders and indexers can comprise separate computer systems, or may alternatively comprise separate processes executing on one or more computer systems.

Each data source 202 broadly represents a source of data can be consumed by a system 108. Examples of a data source 202 include, without limitation, data files, directories of files, data sent over a network, event logs, registries, etc.

During operation, the forwarders 204 identify which indexers 206 receive data collected from a data source 202 and forward the data to the appropriate indexers. Forwarders 204 can also perform operations on the data before forwarding, including removing extraneous data, detecting timestamps in the data, parsing data, indexing data, routing data based on criteria relating to the data being routed, and/or performing other data transformations.

In an embodiment, a forwarder 204 may comprise a service accessible to client devices 102 and host devices 106 via a network 104. For example, one type of forwarder 204 may be capable of consuming vast amounts of real-time data from a potentially large number of client devices 102 and/or host devices 106. The forwarder 204 may, for example, comprise a computing device which implements multiple data pipelines or "queues" to handle forwarding of network data to indexers 206. A forwarder 204 may also perform many of the functions that are herein described for an indexer. For example, a forwarder 204 may perform keyword extractions on raw data or parse raw data in to events and perform keyword extractions. A forwarder 204 may generate time stamps for events. Additionally or alternatively, a forwarder 204 may perform routing of events to indexers.

2.5. Data Ingestion

Figure 3:
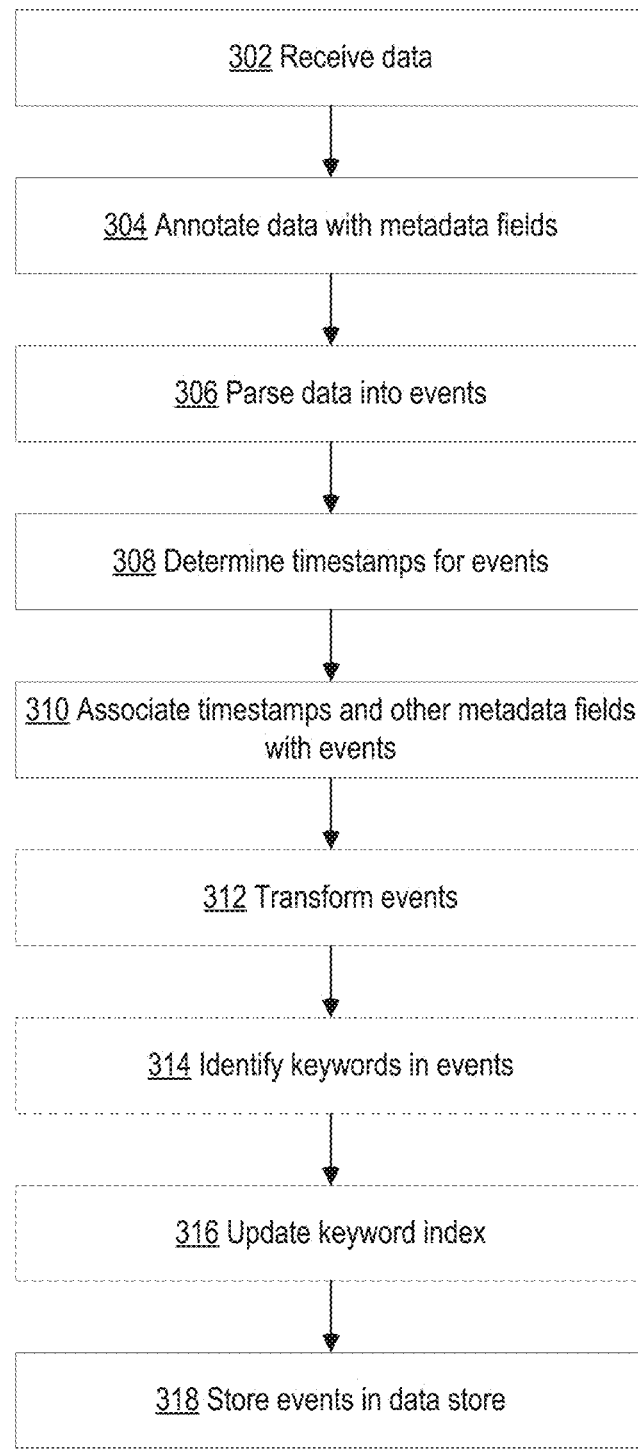
FIG. 3 is a flow diagram that illustrates how indexers process, index, and store data received from forwarders in accordance with the disclosed embodiments.

FIG. 3 depicts a flow chart illustrating an example data flow within a data intake and query system 108, in accordance with the disclosed embodiments. The data flow illustrated in FIG. 3 is provided for illustrative purposes only; one or more of the blocks of the processes illustrated in FIG. 3 may be removed or the ordering of the blocks may be changed. Furthermore, for the purposes of illustrating a clear example, one or more particular system components is described as performing various operations during each of the data flow stages. For example, a forwarder is described as receiving and processing data during an input phase, an indexer is described as parsing and indexing data during parsing and indexing phases, and a search head is described as performing a search query during a search phase. However, it is noted that other system arrangements and distributions of the processing blocks across system components may be used.

2.5.1. Input

At block 302, a forwarder receives data from an input source. A forwarder, for example, initially may receive the data as a raw data stream generated by the input source. For example, a forwarder may receive a data stream from a log file generated by an application server, from a stream of network data from a network device, or from any other source of data. In one embodiment, a forwarder receives the raw data and may segment the data stream into "blocks" or "buckets," possibly of a uniform data size, to facilitate subsequent processing blocks.

At block 304, a forwarder or other system component annotates each block generated from the raw data with one or more metadata fields. These metadata fields may, for example, provide information related to the data block as a whole and may apply to each event that is subsequently derived from the data in the data block. For example, the metadata fields may include separate fields specifying each of a host, a source, and a source type related to the data block. A host field, for example, may contain a value identifying a host name or IP address of a device that generated the data. A source field may contain a value identifying a source of the data, such as a pathname of a file or a protocol and port related to received network data. A source type field may contain a value specifying a particular source type label for the data. Additional metadata fields may also be included during the input phase, such as a character encoding of the data if known, and possibly other values that provide information relevant to later processing blocks. In an embodiment, a forwarder forwards the data to another system component for further processing, typically forwarding the annotated data blocks to an indexer.

2.5.2. Parsing

At block 306, an indexer receives data blocks from a forwarder and parses the data to organize the data into events. In an embodiment, to organize the data into events, an indexer may determine a source type associated with each data block (e.g., by extracting a source type label from the metadata fields associated with the data block, etc.) and refer to a source type configuration corresponding to the identified source type. The source type definition may include one or more properties that indicate to the indexer what are the boundaries of events within the data. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a source type for the data is unknown to the indexer, an indexer may infer a source type for the data by examining the structure of the data and apply an inferred source type definition to the data to create the events.

At block 308, the indexer determines a timestamp for each event. Similar to the process for creating events, an indexer may again refer to a source type definition associated with the data to locate one or more properties that indicate instructions for determining a timestamp for each event. The properties may, for example, instruct an indexer to extract a time value from a portion of data in the event, to interpolate time values based on timestamps associated with temporally proximate events, to create a timestamp based on a time the event data was received or generated, to use the timestamp of a previous event, or based on any other rules for determining timestamps.

At block 310, the indexer associates with each event one or more metadata fields including a field containing the timestamp determined for the event. These metadata fields may include a number of "default fields" that are associated with all events, and may also include one more custom fields as defined by a user. Similar to the metadata fields associated with the data blocks at block 304, the default metadata fields associated with each event may include a host, source, and source type field in addition to a field storing the timestamp.

At block 312, an indexer may optionally apply one or more transformations to data included in the events created at block 306. For example, such transformations can include removing a portion of an event (e.g., a portion used to define event boundaries, extraneous characters from the event, other extraneous text, etc.), masking a portion of an event (e.g., masking a credit card number), removing redundant portions of an event, etc. The transformations applied to event data may, for example, be specified in one or more configuration files and referenced by one or more source type definitions.

2.5.3. Indexing

At blocks 314 and 316, an indexer can optionally generate a keyword index to facilitate fast keyword searching for event data. To build a keyword index, at block 314, the indexer identifies a set of keywords in each event. At block 316, the indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword.

In some embodiments, the keyword index may include entries for name-value pairs found in events, where a name-value pair can include a pair of keywords connected by a symbol, such as an equals sign or colon. In this way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2".

At block 318, the indexer stores the events in a data store, where a timestamp can be stored with each event to facilitate searching for events based on a time range. In one embodiment, the stored events are organized into "buckets," where each bucket stores events associated with a specific time range based on the timestamps associated with each event. This may not only improve time-based searching, but also allows for events with recent timestamps, which may have a higher likelihood of being accessed, to be stored in faster memory to facilitate faster retrieval. For example, buckets containing the most recent events can be stored in flash memory instead of on hard disk.

Each indexer 206 may be responsible for storing and searching a subset of the events contained in a corresponding data store 208. By distributing events among the indexers and data stores, the indexers can analyze events for a query in parallel, for example, using map-reduce techniques, wherein each indexer returns partial responses for a subset of events to a search head that combines the results to produce an answer for the query. By storing events in buckets for specific time ranges, an indexer may further optimize searching by looking only in buckets for time ranges that are relevant to a query.

Moreover, events and buckets can also be replicated across different indexers and data stores to facilitate high availability and disaster recovery as is described in U.S. patent application Ser. No. 14/266,812, entitled "SITE-BASED SEARCH AFFINITY", filed on 30 Apr. 2014, and in U.S. patent application Ser. No. 14/266,817, entitled "MULTI-SITE CLUSTERING", also filed on 30 Apr. 2014, each of which is hereby incorporated by reference in its entirety for all purposes.

Those skilled in the art will appreciate that the blocks shown in FIG. 3 and in each of the flow diagrams discussed below may be altered in a variety of ways. For example, the order of the blocks may be rearranged; some blocks may be performed in parallel; shown blocks may be omitted, or other blocks may be included; a shown block may be divided into subblocks, or multiple shown blocks may be combined into a single block, etc.

2.6. Query Processing

Figure 4:
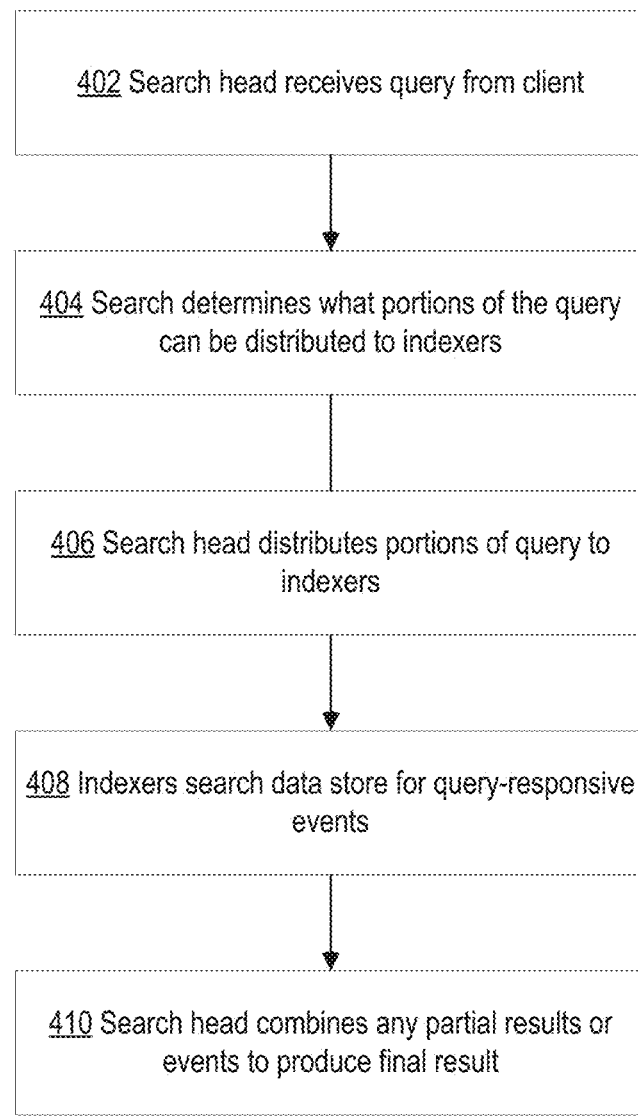
FIG. 4 is a flow diagram that illustrates how a search head and indexers perform a search query in accordance with the disclosed embodiments.

FIG. 4 is a flow diagram that illustrates an example process that a search head and one or more indexers may perform during a search query. At block 402, a search head receives a search query from a client. At block 404, the search head analyzes the search query to determine what portions can be delegated to indexers and what portions can be executed locally by the search head. At block 406, the search head distributes the determined portions of the query to the appropriate indexers. In an embodiment, a search head cluster may take the place of an independent search head where each search head in the search head cluster coordinates with peer search heads in the search head cluster to schedule jobs, replicate artifacts, update configurations, fulfill search requests, etc.

At block 408, the indexers to which the query was distributed search their data stores for events that are responsive to the query. To determine which events are responsive to the query, the indexer searches for events that match the criteria specified in the query. This criteria can include matching keywords or specific values for certain fields. In searches that use a late-binding schema, the searching operations at block 408 may involve using the late-binding schema to extract values for specified fields from events at the time the query is processed. In an embodiment, one or more rules for extracting field values may be specified as part of a source type definition. The indexers may then either send the relevant events back to the search head, or use the events to calculate a partial result, and send the partial result back to the search head.

At block 410, the search head combines the partial results and/or events received from the indexers to produce a result for the query. This result may comprise different types of data depending on what the query requested. For example, the results can include a listing of matching events returned by the query, or some type of visualization of the data from the returned events. In another example, the final result can include one or more calculated values derived from the matching events.

The results generated by the system 108 can be returned to a client using different techniques. For example, one technique streams results back to a client in real-time as they are identified. Another technique waits to report the results to the client until a complete set of results is ready to return to the client. Yet another technique streams interim results back to the client in real-time until a complete set of results is ready, and then returns the complete set of results to the client. In another technique, certain results are stored as "search jobs" and the client may retrieve the results by referring the search jobs.

The search head can also perform various operations to make the search more efficient. For example, before the search head begins execution of a query, the search head can determine a time range for the query and a set of common keywords that all matching events include. The search head may then use these parameters to query the indexers to obtain a superset of the eventual results. Then, during a filtering stage, the search head can perform field-extraction operations on the superset to produce a reduced set of search results. This speeds up queries that are performed on a periodic basis.

2.7. Field Extraction

The search head 210 allows users to search and visualize event data extracted from raw machine data received from homogenous data sources, it also allows users to search and visualize event data extracted from raw machine data received from heterogeneous data sources. The search head 210 includes various mechanisms for processing a query which may additionally reside in an indexer 206. A search query may expressed in Search Processing Language (SPL), which is used in conjunction with the SPLUNK® ENTERPRISE system. SPL is a pipelined search language in which a set of inputs is operated on by a first command in a command line, and then a subsequent command following the pipe symbol "|" operates on the results produced by the first command, and so on for additional commands. A search query can also be expressed in other query languages, such as the Structured Query Language ("SQL") or any other query language.

In response to receiving the search query, search head 210 determines that it can use extraction rules to extract values for the fields associated with a field or fields in the event data being searched. The search head 210 obtains extraction rules that specify how to extract a value for certain fields from an event. Extraction rules can comprise regex rules that specify how to extract values for the relevant fields. In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

The search head 210 can apply the extraction rules to event data that it receives from indexers 206. Indexers 206 may apply the extraction rules to events in an associated data store 208. Extraction rules can be applied to all the events in a data store, or to a subset of the events that have been filtered based on some criteria (e.g., event time stamp values, etc.). Extraction rules can be used to extract one or more values for a field from events by parsing the event data and examining the event data for one or more patterns of characters, numbers, delimiters, etc., that indicate where the field begins and, optionally, ends.

Figure 5:
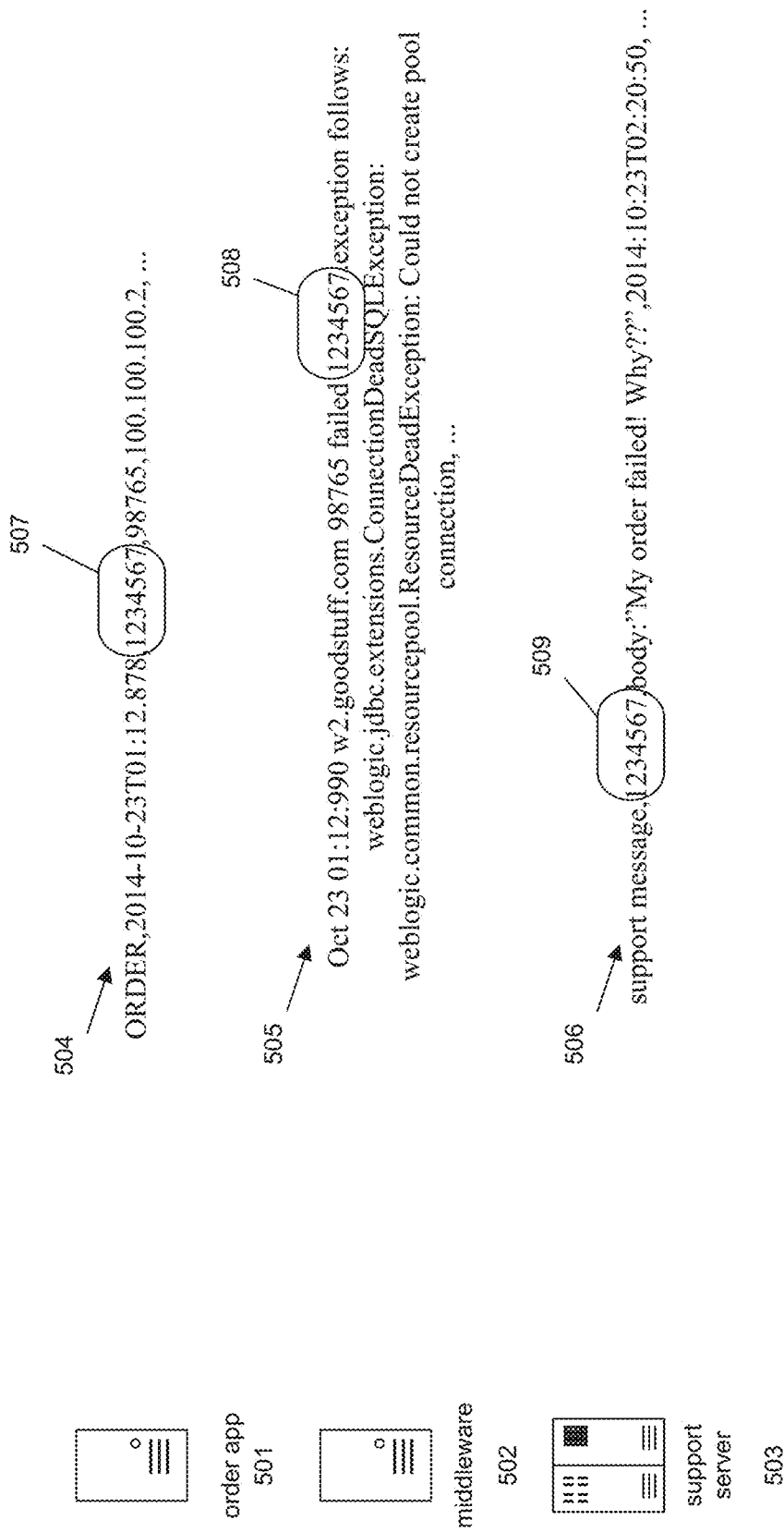
FIG. 5 illustrates a scenario where a common customer ID is found among log data received from three disparate sources in accordance with the disclosed embodiments.

FIG. 5 illustrates an example of raw machine data received from disparate data sources. In this example, a user submits an order for merchandise using a vendor's shopping application program 501 running on the user's system. The order fails to be delivered to the vendor's server due to a resource exception at the destination server which is detected by the middleware code 502. The user then sends a message to customer support 503 to complain about the order failing to complete. The three systems 501, 502, and 503 are disparate systems that do not have a common logging format. The order application 501 sends log data 504 to the SPLUNK® ENTERPRISE system in one format, the middleware code 502 sends error log data 505 in a second format, and the support server 503 sends log data 506 in a third format.

Using the log data received from the three systems, the vendor, goodstuff.com, has the unique ability to obtain an insight into user activity, user experience, and system behavior. The search head 210 allows the vendor's administrator to search the log data received from the three systems to obtain correlated information and also a visualization of related events via a user interface. The administrator can query the search head 210 for customer ID matches across the data received from the three systems. The customer ID exists in the data gathered from the three systems, but the customer ID may be located in different areas of the data given differences in the architecture of the systems—there is a semantic relationship between the customer IDs generated by the three systems. The search head 210 requests event data from one or more indexers 206 in order to gather event data from the three systems. It then applies extraction rules to the event data in order to extract field values that it can correlate. The search head may apply a different extraction rule to each set of events from each system when the event data format differs between each system. In this example, the user interface can display, to the administrator, the event data corresponding to the common customer ID 507, 508, and 509. Thus, providing the administrator with an insight into a customer's experience.

Note that query results can be returned to a client, a search head, or any other system component for further processing. In general, query results may include a set of one or more events, a set of one or more values obtained from the events, a subset of the values, statistics calculated based on the values, a report containing the values, or a visualization, such as a graph or chart, generated from the values.

2.8. Example Search Screen

Figure 6A:
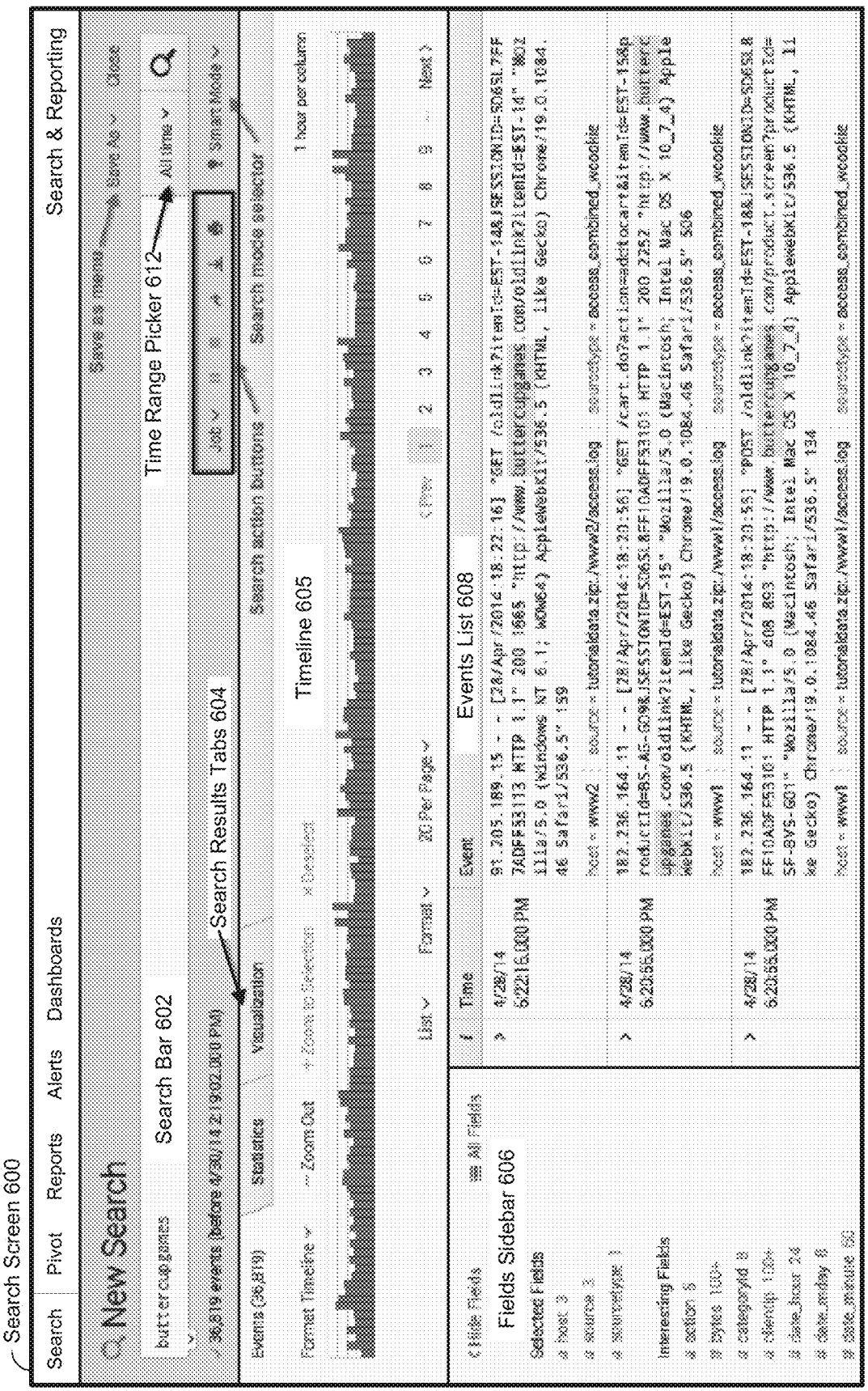
FIG. 6A illustrates a search screen in accordance with the disclosed embodiments.
Figure 6B:
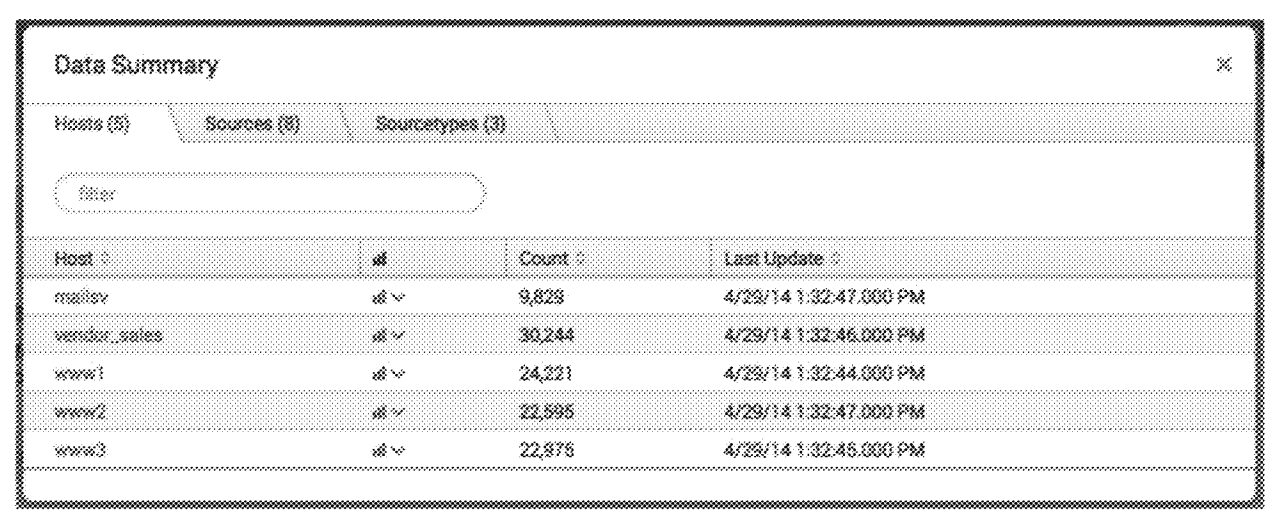

FIG. 6A illustrates an example search screen 600 in accordance with the disclosed embodiments. Search screen 600 includes a search bar 602 that accepts user input in the form of a search string. It also includes a time range picker 612 that enables the user to specify a time range for the search. For "historical searches" the user can select a specific time range, or alternatively a relative time range, such as "today," "yesterday" or "last week." For "real-time searches," the user can select the size of a preceding time window to search for real-time events. Search screen 600 also initially displays a "data summary" dialog as is illustrated in FIG. 6B that enables the user to select different sources for the event data, for example by selecting specific hosts and log files.

After the search is executed, the search screen 600 can display the results through search results tabs 604, wherein search results tabs 604 includes: an "events tab" that displays various information about events returned by the search; a "statistics tab" that displays statistics about the search results; and a "visualization tab" that displays various visualizations of the search results. The events tab illustrated in FIG. 6A displays a timeline graph 605 that graphically illustrates the number of events that occurred in one-hour intervals over the selected time range. It also displays an events list 608 that enables a user to view the raw data in each of the returned events. It additionally displays a fields sidebar 606 that includes statistics about occurrences of specific fields in the returned events, including "selected fields" that are pre-selected by the user, and "interesting fields" that are automatically selected by the system based on pre-specified criteria.

2.9. Data Modelling

In an embodiment, the data intake and query system provides the user with the ability to produce reports (e.g., a table, chart, visualization, etc.) without having to enter SPL, SQL, or other query language terms into a search screen. Data modelling is used as the basis for the search feature. A data model may include one or more "objects" (or "data model objects") that define or otherwise correspond to a specific set of data. For example, a first data model object may define a broad set of data pertaining to e-mail activity generally, and another data model object may define specific datasets within the broad dataset, such as a subset of the e-mail data pertaining specifically to e-mails sent. Examples of data models can include, but are not limited to, electronic mail, authentication, databases, intrusion detection, malware, application state, alerts, compute inventory, network sessions, network traffic, performance, audits, updates, vulnerabilities, etc. Data models and their objects can be designed, for example, by knowledge managers in an organization, and they can enable downstream users to quickly focus on a specific set of data. For example, a user can simply select an "e-mail activity" data model object to access a dataset relating to e-mails generally (e.g., sent or received), or select an "e-mails sent" data model object (or data sub-model object) to access a dataset relating to e-mails sent.

A data model object may be defined by (1) a set of search constraints, and (2) a set of fields. Thus, a data model object can be used to quickly search data to identify a set of events and to identify a set of fields to be associated with the set of events. For example, an "e-mails sent" data model object may specify a search for events relating to e-mails that have been sent, and specify a set of fields that are associated with the events. Thus, a user can retrieve and use the "e-mails sent" data model object to quickly search source data for events relating to sent e-mails, and may be provided with a listing of the set of fields relevant to the events in a user interface screen.

A data model may be defined by search criteria (e.g., a set of search constraints, late-binding schema extraction rules, etc.) and an associated set of fields. A data sub-model (e.g., a child of the parent data model) may be defined by a search (typically a narrower search) that produces a subset of the events that would be produced by the parent data model's search, and the sub-model's set of fields can include a subset of the set of fields of the parent data model and/or additional fields. Data model objects that reference the subsets can be arranged in a hierarchical manner, so that child subsets of events are proper subsets of their parents. A user iteratively applies a model development tool to prepare a query that defines a subset of events and assigns an object name to that subset. A child subset is created by further limiting a query that generates a parent subset. A late-binding schema or sub-schema of field extraction rules is associated with each object or subset in the data model. Data definitions in associated schemas or sub-schemas can be taken from the common information model (CIM) or can be devised for a particular sub-schema and optionally added to the CIM. Child objects inherit fields from parents and can include fields not present in parents. A model developer can select fewer extraction rules than are available for the sources returned by the query that defines events belonging to a model. Selecting a limited set of extraction rules can be a tool for simplifying and focusing the data model, while allowing a user flexibility to explore the data subset. Development of a data model is further explained in U.S. Pat. No. 8,788,525, entitled "DATA MODEL FOR MACHINE DATA FOR SEMANTIC SEARCH", issued on Jul. 22, 2014, U.S. Pat. No. 8,788,526, entitled "DATA MODEL FOR MACHINE DATA FOR SEMANTIC SEARCH", issued on Jul. 22, 2014, and U.S. patent application Ser. No. 14/067,203, entitled "GENERATION OF A DATA MODEL FOR SEARCHING MACHINE DATA", filed on 30 Oct. 2013, each of which is hereby incorporated by reference in its entirety for all purposes. See, also, Knowledge Manager Manual, Build a Data Model, Splunk Enterprise 6.1.3 pp. 150-204 (Aug. 25, 2014).

A data model can also include reports. One or more report formats can be associated with a particular data model and be made available to run against the data model. A user can use child objects to design reports with object datasets that already have extraneous data pre-filtered out.

Data models may be selected in a report generation interface. The report generator supports drag-and-drop organization of fields to be summarized in a report. When a model is selected, the fields with available extraction rules are made available for use in the report. A user selects some fields for organizing the report and others for providing detail according to the report organization. For example, region and salesperson fields may be organizing fields and sales data can be summarized (subtotaled and totaled) within this organization. Building reports using the report generation interface is further explained in U.S. patent application Ser. No. 14/503,335, entitled "GENERATING REPORTS FROM UNSTRUCTURED DATA", filed on Sep. 30, 2014, and which is hereby incorporated by reference in its entirety for all purposes, and in Pivot Manual, Splunk Enterprise 6.1.3 (Aug. 4, 2014). Data visualizations also can be generated in a variety of formats, by reference to the data model. Reports, data visualizations, and data model objects can be saved and associated with the data model for future use. The data model object may be used to perform searches of other data.

FIGS. 7A-7D illustrate a series of user interface screens where a user may select report generation options using data models. The report generation process may be driven by a predefined data model object, such as a data model object defined and/or saved via a reporting application or a data model object obtained from another source. A user can load a saved data model object using a report editor. For example, the initial search query and fields used to drive the report editor may be obtained from a data model object. The data model object that is used to drive a report generation process may define a search and a set of fields. Upon loading of the data model object, the report generation process may enable a user to use the fields (e.g., the fields defined by the data model object) to define criteria for a report (e.g., filters, split rows/columns, aggregates, etc.) and the search may be used to identify events (e.g., to identify events responsive to the search) used to generate the report. That is, for example, if a data model object is selected to drive a report editor, the graphical user interface of the report editor may enable a user to define reporting criteria for the report using the fields associated with the selected data model object, and the events used to generate the report may be constrained to the events that match, or otherwise satisfy, the search constraints of the selected data model object.

The selection of a data model object for use in driving a report generation may be facilitated by a data model object selection interface. For example, an interactive data model selection graphical user interface of a report editor may display a listing of available data models, enabling a user to select one of the data models, display the data model objects associated with the data model selected, and enable a user to select one of the displayed data model objects for use in driving the report generation process.

Figure 7A:
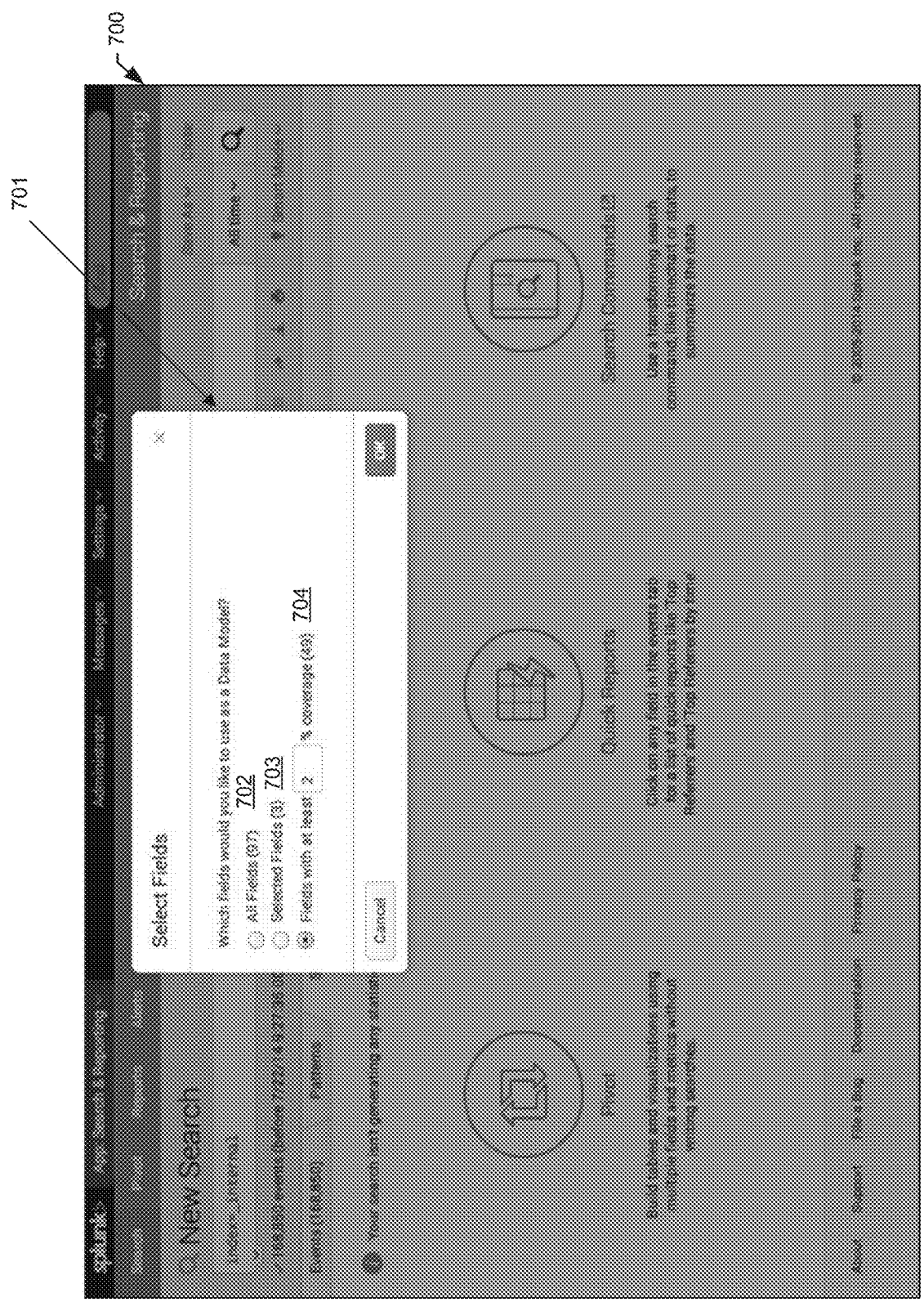
FIG. 7A-7D illustrate a series of user interface screens for an example data model driven report generation interface in accordance with the disclosed embodiments.

In FIG. 7A, once a data model object is selected by the user, a user interface screen 700 may display an interactive listing of automatic field identification options 701 based on the selected data model object. For example, a user may select one of the three illustrated options (e.g., the "All Fields" option 702, the "Selected Fields" option 703, or the "Coverage" option (e.g., fields with at least a specified % of coverage) 704). If the user selects the "All Fields" option 702, all of the fields identified from the events that were returned in response to an initial search query may be selected. That is, for example, all of the fields of the identified data model object fields may be selected. If the user selects the "Selected Fields" option 703, only the fields from the fields of the identified data model object fields that are selected by the user may be used. If the user selects the "Coverage" option 704, only the fields of the identified data model object fields meeting a specified coverage criteria may be selected. A percent coverage may refer to the percentage of events returned by the initial search query that a given field appears in. Thus, for example, if an object dataset includes 10,000 events returned in response to an initial search query, and the "avg_age" field appears in 854 of those 10,000 events, then the "avg_age" field would have a coverage of 8.54% for that object dataset. If, for example, the user selects the "Coverage" option and specifies a coverage value of 2%, only fields having a coverage value equal to or greater than 2% may be selected. The number of fields corresponding to each selectable option may be displayed in association with each option. For example, "97" displayed next to the "All Fields" option 702 indicates that 97 fields will be selected if the "All Fields" option is selected. The "3" displayed next to the "Selected Fields" option 703 indicates that 3 of the 97 fields will be selected if the "Selected Fields" option is selected. The "49" displayed next to the "Coverage" option 704 indicates that 49 of the 97 fields (e.g., the 49 fields having a coverage of 2% or greater) will be selected if the "Coverage" option is selected. The number of fields corresponding to the "Coverage" option may be dynamically updated based on the specified percent of coverage.

Figure 7B:
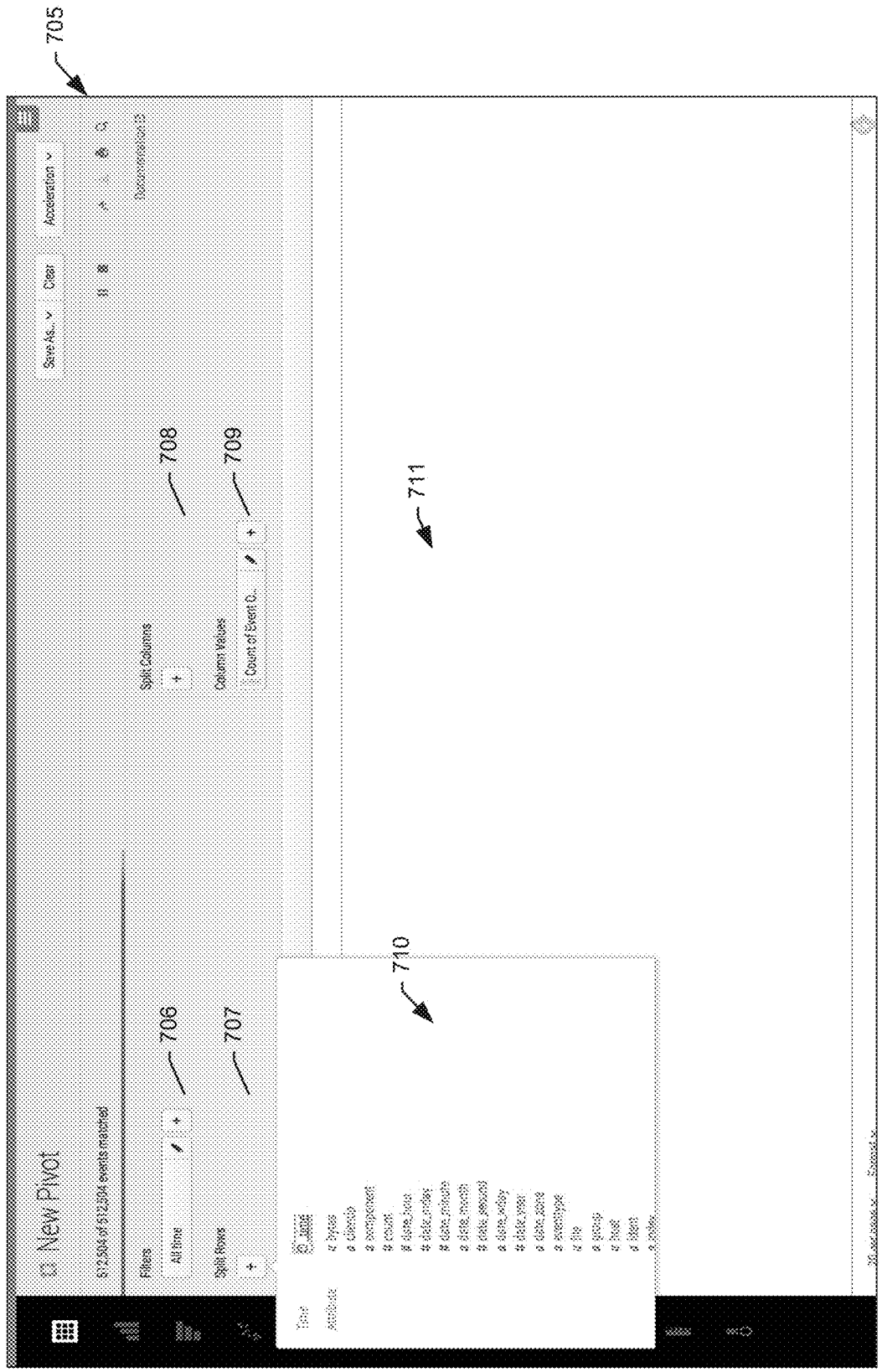

FIG. 7B illustrates a graphical user interface screen 705 displaying the reporting application's "Report Editor" page. The screen may display interactive elements for defining various elements of a report. For example, the page includes a "Filters" element 706, a "Split Rows" element 707, a "Split Columns" element 708, and a "Column Values" element 709. The page may include a list of search results 711. In this example, the Split Rows element 707 is expanded, revealing a listing of fields 710 that can be used to define additional criteria (e.g., reporting criteria). The listing of fields 710 may correspond to the selected fields (attributes). That is, the listing of fields 710 may list only the fields previously selected, either automatically and/or manually by a user.

Figure 7C:
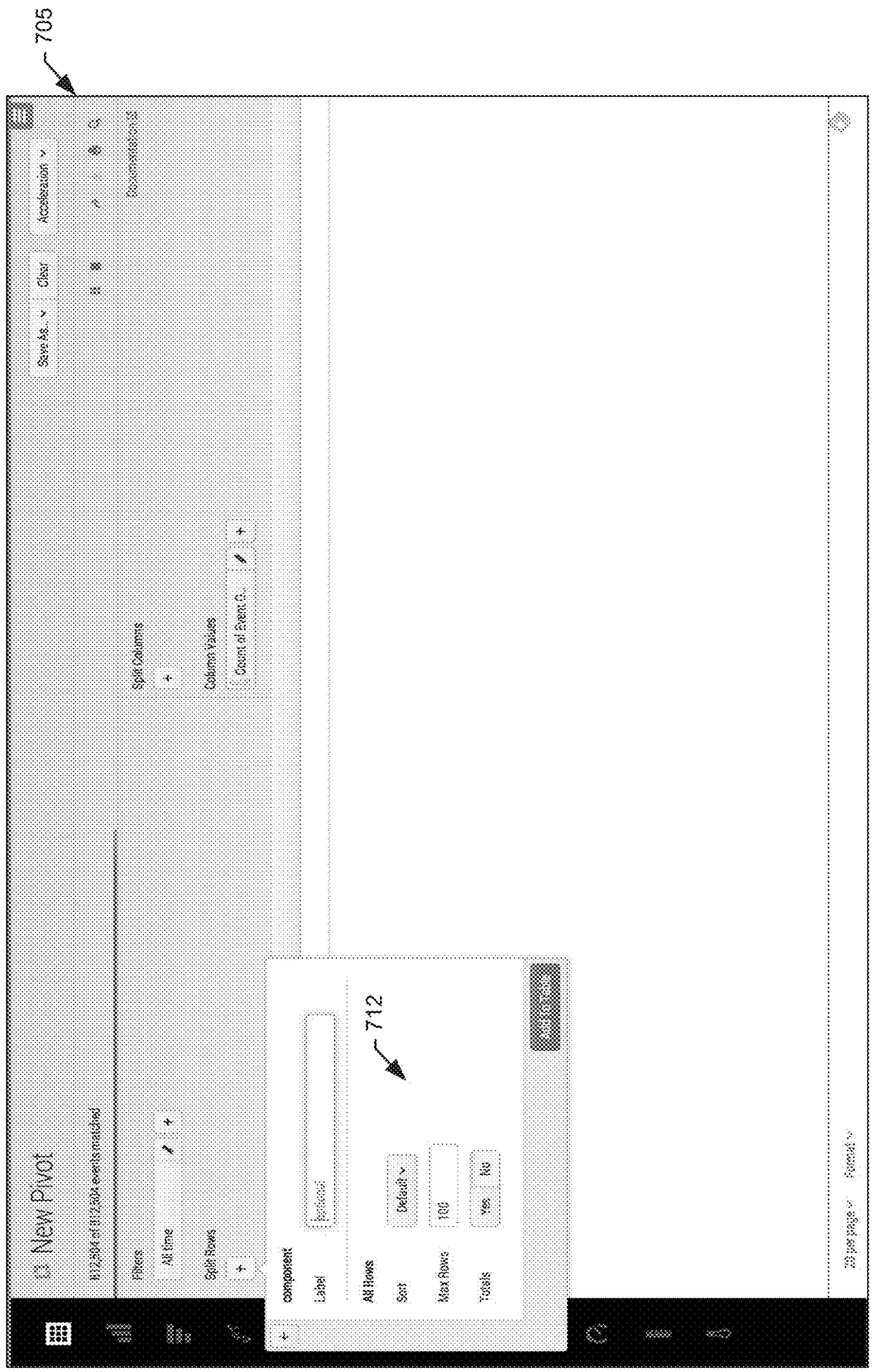

FIG. 7C illustrates a formatting dialogue 712 that may be displayed upon selecting a field from the listing of fields 710. The dialogue can be used to format the display of the results of the selection (e.g., label the column to be displayed as "component").

Figure 7D:
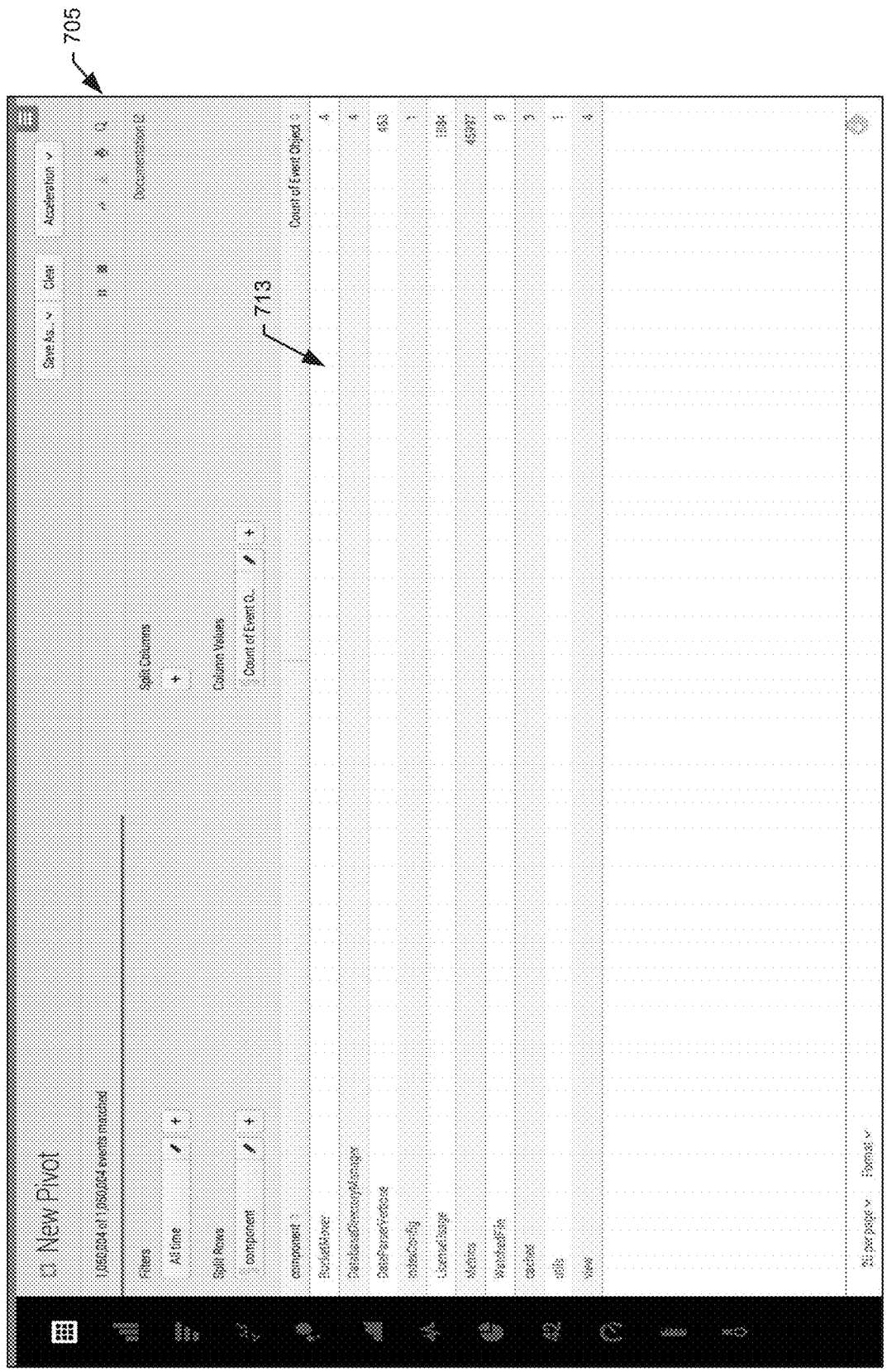

FIG. 7D illustrates an example graphical user interface screen 705 including a table of results 713 based on the selected criteria including splitting the rows by the "component" field.

2.10. Acceleration Technique

The above-described system provides significant flexibility by enabling a user to analyze massive quantities of minimally processed performance data "on the fly" at search time instead of storing pre-specified portions of the performance data in a database at ingestion time. This flexibility enables a user to see correlations in the performance data and perform subsequent queries to examine interesting aspects of the performance data that may not have been apparent at ingestion time.

However, performing extraction and analysis operations at search time can involve a large amount of data and require a large number of computational operations, which can cause considerable delays while processing the queries. Fortunately, a number of acceleration techniques have been developed to speed up analysis operations performed at search time. These techniques include: (1) performing search operations in parallel across multiple indexers; (2) using a keyword index; (3) using a high performance analytics store; and (4) accelerating the process of generating reports. These techniques are described in more detail below.

2.10.1. Aggregation Technique

Figure 8:
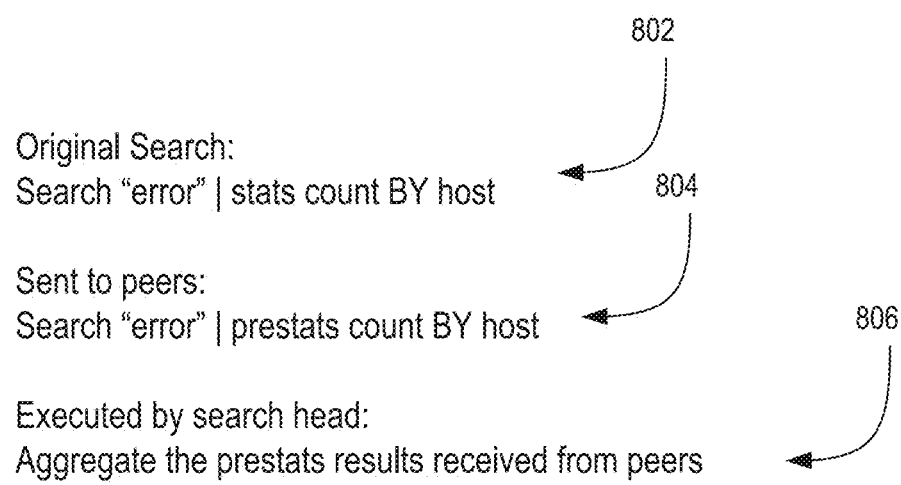
FIG. 8 illustrates an example search query received from a client and executed by search peers in accordance with the disclosed embodiments.

To facilitate faster query processing, a query can be structured such that multiple indexers perform the query in parallel, while aggregation of search results from the multiple indexers is performed locally at the search head. For example, FIG. 8 illustrates how a search query 802 received from a client at a search head 210 can split into two phases, including: (1) subtasks 804 (e.g., data retrieval or simple filtering) that may be performed in parallel by indexers 206 for execution, and (2) a search results aggregation operation 806 to be executed by the search head when the results are ultimately collected from the indexers.

During operation, upon receiving search query 802, a search head 210 determines that a portion of the operations involved with the search query may be performed locally by the search head. The search head modifies search query 802 by substituting "stats" with "prestats" to produce search query 804, and then distributes search query 804 to distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as is illustrated in FIG. 4, or may alternatively distribute a modified version (e.g., a more restricted version) of the search query to the search peers. In this example, the indexers are responsible for producing the results and sending them to the search head. After the indexers return the results to the search head, the search head aggregates the received results 806 to form a single search result set. Note that by executing the computation in this way, the system effectively distributes the computational operations across the indexers while minimizing data transfers.

2.10.2. Keyword Index

As described above with reference to the flow charts in FIG. 3 and FIG. 4, data intake and query system 108 can construct and maintain one or more keyword indices to facilitate rapidly identifying events containing specific keywords. This can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

2.10.3. High Performance Analytics Store

To speed up certain types of queries, some embodiments of system 108 make use of a high performance analytics store, which is referred to as a "summarization table," that contains entries for specific field-value pairs. Each of these entries keeps track of instances of a specific value in a specific field in the event data and includes references to events containing the specific value in the specific field. For example, an example entry in a summarization table can keep track of occurrences of the value "94107" in a "ZIP code" field of a set of events, wherein the entry includes references to all of the events that contain the value "94107" in the ZIP code field. This enables the system to quickly process queries that seek to determine how many events have a particular value for a particular field, because the system can examine the entry in the summarization table to count instances of the specific value in the field without having to go through the individual events or do extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range, wherein a bucket-specific summarization table includes entries for specific field-value combinations that occur in events in the specific bucket. Alternatively, the system can maintain a separate summarization table for each indexer, wherein the indexer-specific summarization table only includes entries for the events in a data store that is managed by the specific indexer. Indexer-specific summarization tables may also be bucket-specific.

The summarization table can be populated by running a "collection query" that scans a set of events to find instances of a specific field-value combination, or alternatively instances of all field-value combinations for a specific field. A collection query can be initiated by a user, or can be scheduled to occur automatically at specific time intervals. A collection query can also be automatically launched in response to a query that asks for a specific field-value combination.

In some cases, the summarization tables may not cover all of the events that are relevant to a query. In this case, the system can use the summarization tables to obtain partial results for the events that are covered by summarization tables, but may also have to search through other events that are not covered by the summarization tables to produce additional results. These additional results can then be combined with the partial results to produce a final set of results for the query. This summarization table and associated techniques are described in more detail in U.S. Pat. No. 8,682,925, entitled "DISTRIBUTED HIGH PERFORMANCE ANALYTICS STORE", issued on Mar. 25, 2014, and which is hereby incorporated by reference in its entirety for all purposes.

2.10.4. Accelerating Report Generation

In some embodiments, a data server system such as the SPLUNK® ENTERPRISE system can accelerate the process of periodically generating updated reports based on query results. To accelerate this process, a summarization engine automatically examines the query to determine whether generation of updated reports can be accelerated by creating intermediate summaries. (This is possible if results from preceding time periods can be computed separately and combined to generate an updated report. In some cases, it is not possible to combine such incremental results, for example where a value in the report depends on relationships between events from different time periods.) If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In parallel with the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so only the newer event data needs to be processed while generating an updated report. These report acceleration techniques are described in more detail in U.S. Pat. No. 8,589,403, entitled "COMPRESSED JOURNALING IN EVENT TRACKING FILES FOR METADATA RECOVERY AND REPLICATION", issued on 19 Nov. 2013, and U.S. Pat. No. 8,412,696, entitled "REAL TIME SEARCHING AND REPORTING", issued on 2 Apr. 2011, each of which is hereby incorporated by reference in its entirety for all purposes.

2.11. Security Features

The SPLUNK® ENTERPRISE platform provides various schemas, dashboards and visualizations that make it easy for developers to create applications to provide additional capabilities. One such application is the SPLUNK® APP FOR ENTERPRISE SECURITY, which performs monitoring and alerting operations and includes analytics to facilitate identifying both known and unknown security threats based on large volumes of data stored by the SPLUNK® ENTERPRISE system. This differs significantly from conventional Security Information and Event Management (SIEM) systems that lack the infrastructure to effectively store and analyze large volumes of security-related event data. Traditional SIEM systems typically use fixed schemas to extract data from pre-defined security-related fields at data ingestion time, wherein the extracted data is typically stored in a relational database. This data extraction process (and associated reduction in data size) that occurs at data ingestion time inevitably hampers future incident investigations, when all of the original data may be needed to determine the root cause of a security issue, or to detect the tiny fingerprints of an impending security threat.

In contrast, the SPLUNK® APP FOR ENTERPRISE SECURITY system stores large volumes of minimally processed security-related data at ingestion time for later retrieval and analysis at search time when a live security threat is being investigated. To facilitate this data retrieval process, the SPLUNK® APP FOR ENTERPRISE SECURITY provides pre-specified schemas for extracting relevant values from the different types of security-related event data, and also enables a user to define such schemas.

The SPLUNK® APP FOR ENTERPRISE SECURITY can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. (The process of detecting security threats for network-related information is further described in U.S. patent application Ser. No. 13/956,252, and Ser. No. 13/956,262.) Security-related information can also include endpoint information, such as malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the SPLUNK® APP FOR ENTERPRISE SECURITY facilitates detecting so-called "notable events" that are likely to indicate a security threat. These notable events can be detected in a number of ways: (1) an analyst can notice a correlation in the data and can manually identify a corresponding group of one or more events as "notable;" or (2) an analyst can define a "correlation search" specifying criteria for a notable event, and every time one or more events satisfy the criteria, the application can indicate that the one or more events are notable. An analyst can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

Figure 9A:
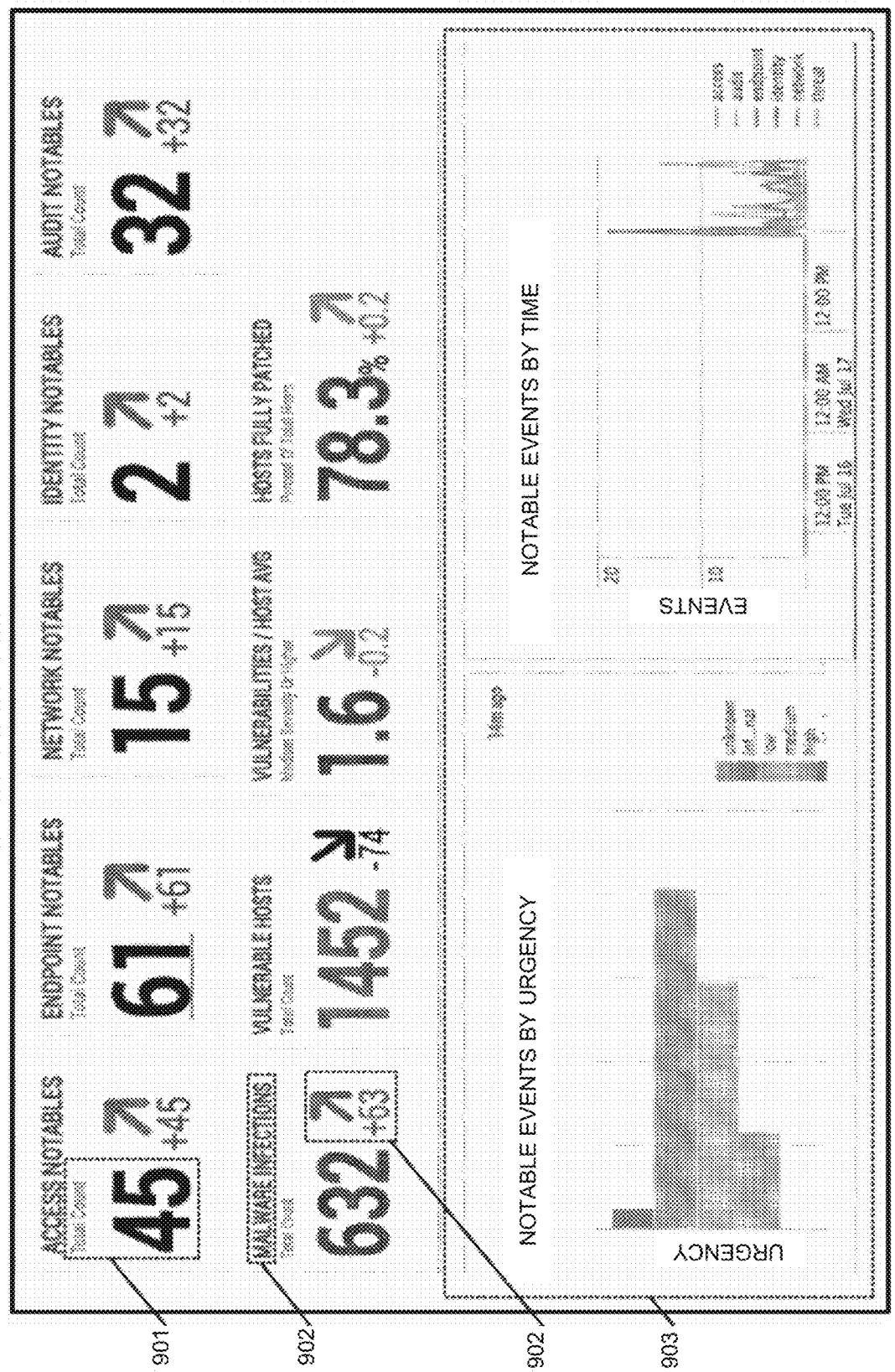
FIG. 9A illustrates a key indicators view in accordance with the disclosed embodiments.

The SPLUNK® APP FOR ENTERPRISE SECURITY provides various visualizations to aid in discovering security threats, such as a "key indicators view" that enables a user to view security metrics of interest, such as counts of different types of notable events. For example, FIG. 9A illustrates an example key indicators view 900 that comprises a dashboard, which can display a value 901, for various security-related metrics, such as malware infections 902. It can also display a change in a metric value 903, which indicates that the number of malware infections increased by 63 during the preceding interval. Key indicators view 900 additionally displays a histogram panel 904 that displays a histogram of notable events organized by urgency values, and a histogram of notable events organized by time intervals. This key indicators view is described in further detail in pending U.S. patent application Ser. No. 13/956,338, entitled "KEY INDICATORS VIEW", filed Jul. 31, 2013, and which is hereby incorporated by reference in its entirety for all purposes.

Figure 9B:
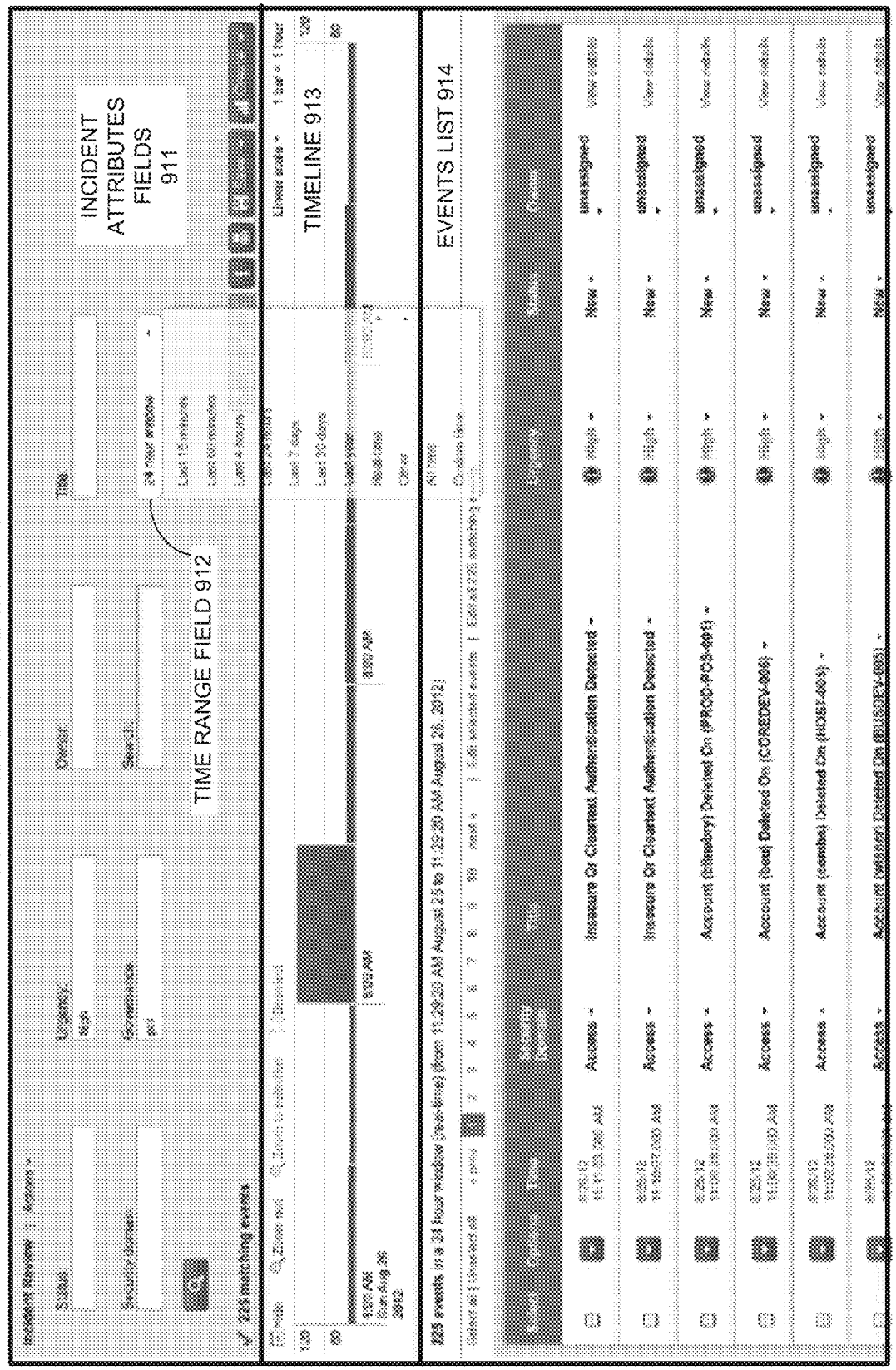
FIG. 9B illustrates an incident review dashboard in accordance with the disclosed embodiments.

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 9B illustrates an example incident review dashboard 910 that includes a set of incident attribute fields 911 that, for example, enables a user to specify a time range field 912 for the displayed events. It also includes a timeline 913 that graphically illustrates the number of incidents that occurred in one-hour time intervals over the selected time range. It additionally displays an events list 914 that enables a user to view a list of all of the notable events that match the criteria in the incident attributes fields 911. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event.

2.12. Data Center Monitoring

As mentioned above, the SPLUNK® ENTERPRISE platform provides various features that make it easy for developers to create various applications. One such application is the SPLUNK® APP FOR VMWARE®, which performs monitoring operations and includes analytics to facilitate diagnosing the root cause of performance problems in a data center based on large volumes of data stored by the SPLUNK® ENTERPRISE system.

This differs from conventional data-center-monitoring systems that lack the infrastructure to effectively store and analyze large volumes of performance information and log data obtained from the data center. In conventional data-center-monitoring systems, this performance data is typically pre-processed prior to being stored, for example by extracting pre-specified data items from the performance data and storing them in a database to facilitate subsequent retrieval and analysis at search time. However, the rest of the performance data is not saved and is essentially discarded during pre-processing. In contrast, the SPLUNK® APP FOR VMWARE® stores large volumes of minimally processed performance information and log data at ingestion time for later retrieval and analysis at search time when a live performance issue is being investigated.

The SPLUNK® APP FOR VMWARE® can process many types of performance-related information. In general, this performance-related information can include any type of performance-related data and log data produced by virtual machines and host computer systems in a data center. In addition to data obtained from various log files, this performance-related information can include values for performance metrics obtained through an application programming interface (API) provided as part of the vSphere Hypervisor™ system distributed by VMware, Inc. of Palo Alto, Calif. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. Such performance metrics are described in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed 29 Jan. 2014, and which is hereby incorporated by reference in its entirety for all purposes.

To facilitate retrieving information of interest from performance data and log files, the SPLUNK® APP FOR VMWARE® provides pre-specified schemas for extracting relevant values from different types of performance-related event data, and also enables a user to define such schemas.

Figure 9C:
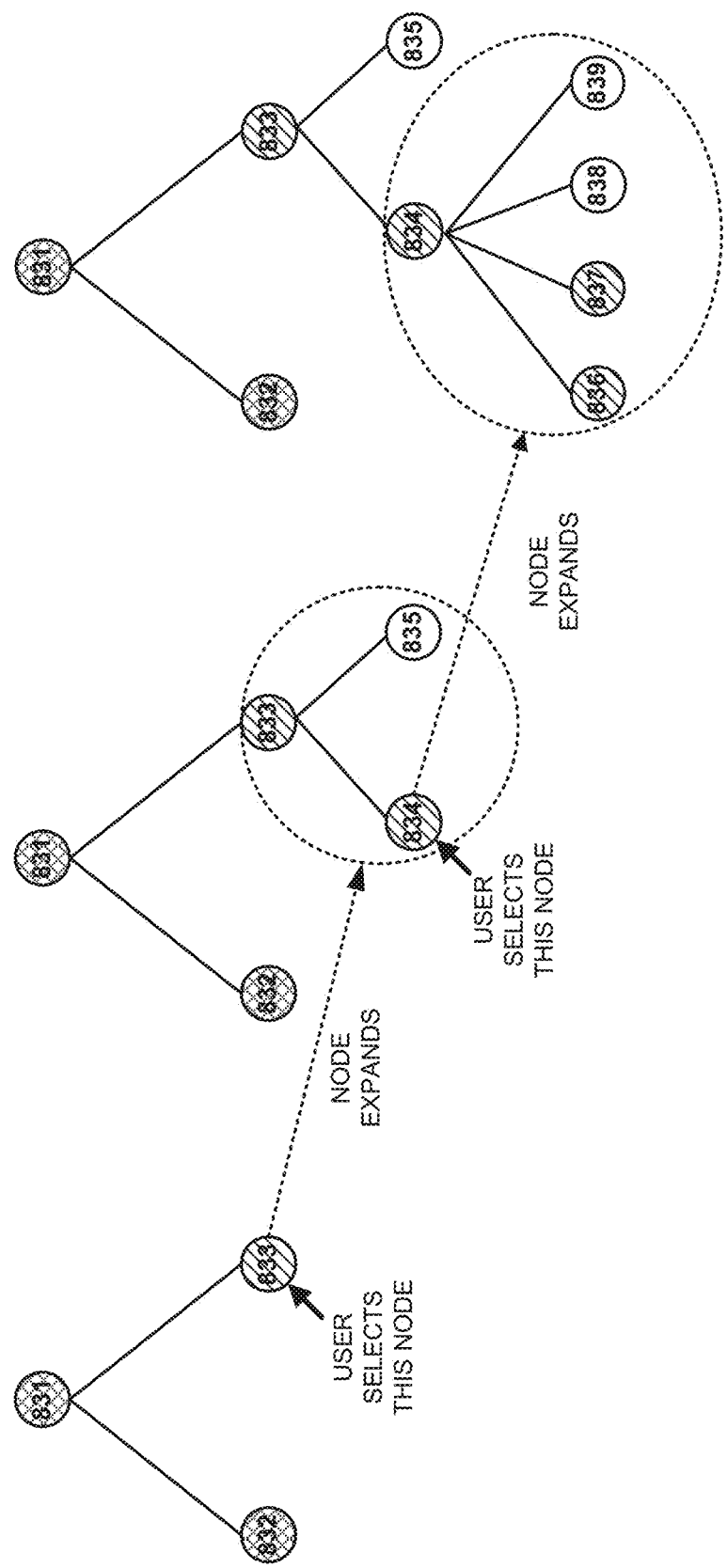
FIG. 9C illustrates a proactive monitoring tree in accordance with the disclosed embodiments.

The SPLUNK® APP FOR VMWARE® additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems). Example node-expansion operations are illustrated in FIG. 9C, wherein nodes 933 and 934 are selectively expanded. Note that nodes 931-939 can be displayed using different patterns or colors to represent different performance states, such as a critical state, a warning state, a normal state or an unknown/offline state. The ease of navigation provided by selective expansion in combination with the associated performance-state information enables a user to quickly diagnose the root cause of a performance problem. The proactive monitoring tree is described in further detail in U.S. patent application Ser. No. 14/235,490, entitled "TRANSMISSION APPARATUS AND METHOD, AND RECEPTION APPARATUS AND METHOD FOR PROVIDING 3D SERVICE USING THE CONTENT AND ADDITIONAL IMAGE SEPARATELY TRANSMITTED WITH THE REFERENCE IMAGE TRANSMITTED IN REAL TIME", filed on 15 Apr. 2014, and which is hereby incorporated by reference in its entirety for all purposes.

Figure 9D:
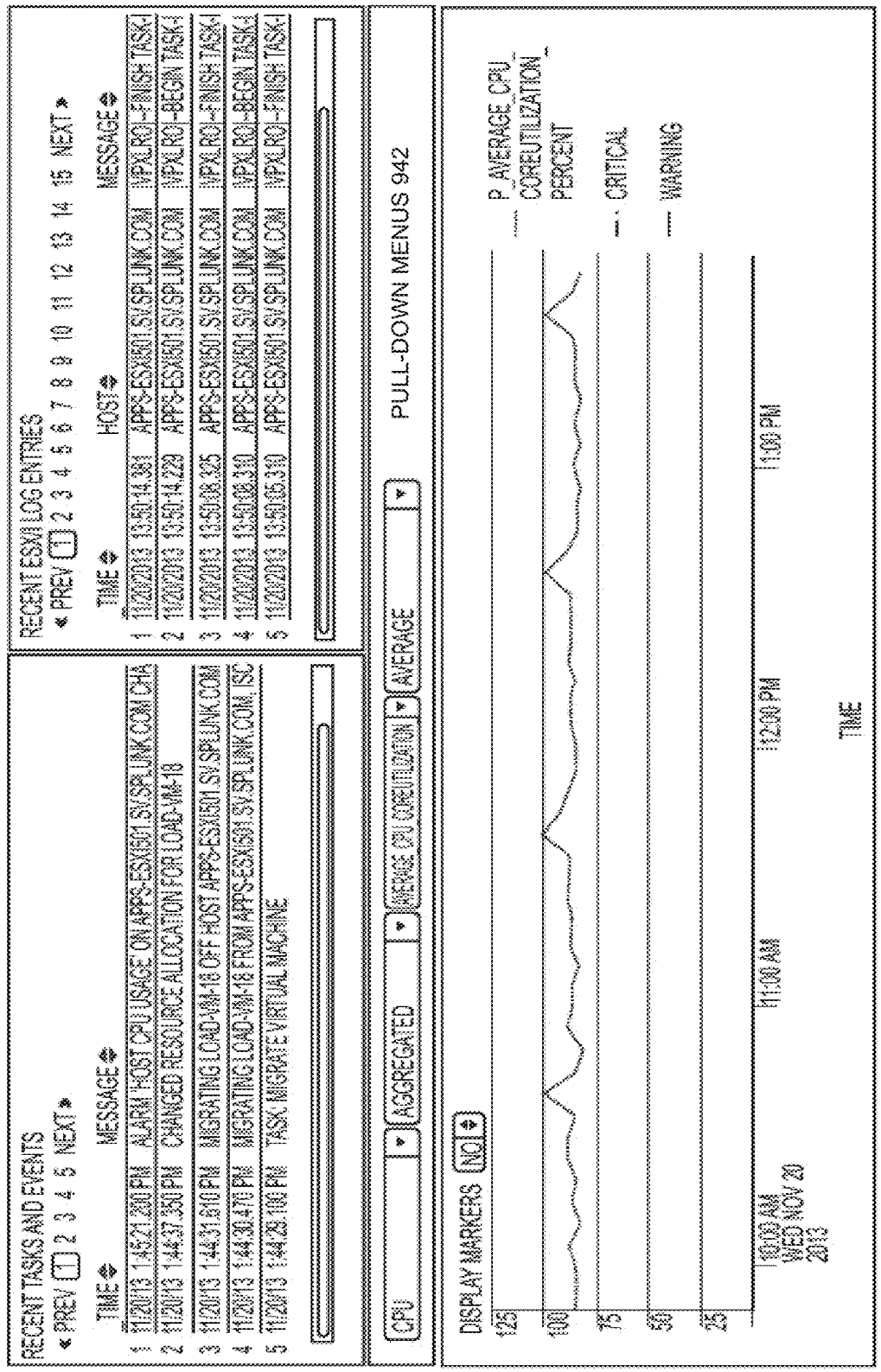
FIG. 9D illustrates a user interface screen displaying both log data and performance data in accordance with the disclosed embodiments.

The SPLUNK® APP FOR VMWARE® also provides a user interface that enables a user to select a specific time range and then view heterogeneous data, comprising events, log data and associated performance metrics, for the selected time range. For example, the screen illustrated in FIG. 9D displays a listing of recent "tasks and events" and a listing of recent "log entries" for a selected time range above a performance-metric graph for "average CPU core utilization" for the selected time range. Note that a user is able to operate pull-down menus 942 to selectively display different performance metric graphs for the selected time range. This enables the user to correlate trends in the performance-metric graph with corresponding event and log data to quickly determine the root cause of a performance problem. This user interface is described in more detail in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes.

2.13. Cloud-Based System Overview

The example data intake and query system 108 described in reference to FIG. 2 comprises several system components, including one or more forwarders, indexers, and search heads. In some environments, a user of a data intake and query system 108 may install and configure, on computing devices owned and operated by the user, one or more software applications that implement some or all of these system components. For example, a user may install a software application on server computers owned by the user and configure each server to operate as one or more of a forwarder, an indexer, a search head, etc. This arrangement generally may be referred to as an "on-premises" solution, meaning the system 108 is installed and operates on computing devices directly controlled by the user of the system. Some users may prefer an on-premises solution since it may provide a greater level of control over the configuration of certain aspects of the system. However, other users may instead prefer an arrangement in which the user is not directly responsible for providing and managing the computing devices upon which various components of system 108 operate.

In one embodiment, to provide an alternative to an entirely on-premises environment for system 108, one or more of the components of a data intake and query system instead may be provided as a cloud-based service. In this context, a cloud-based service refers to a service hosted by one more computing resources that are accessible to end users over a network, for example, by using a web browser or other application on a client device to interface with the remote computing resources. For example, a service provider may provide a cloud-based data intake and query system by managing computing resources configured to implement various aspects of the system (e.g., forwarders, indexers, search heads, etc.) and providing access to the system to end users via a network. Typically, a user may pay a subscription or other fee to use such a service, and each subscribing user to the cloud-based service may be provided with an account that enables the user to configure a customized cloud-based system based on the user's preferences.

Figure 10:
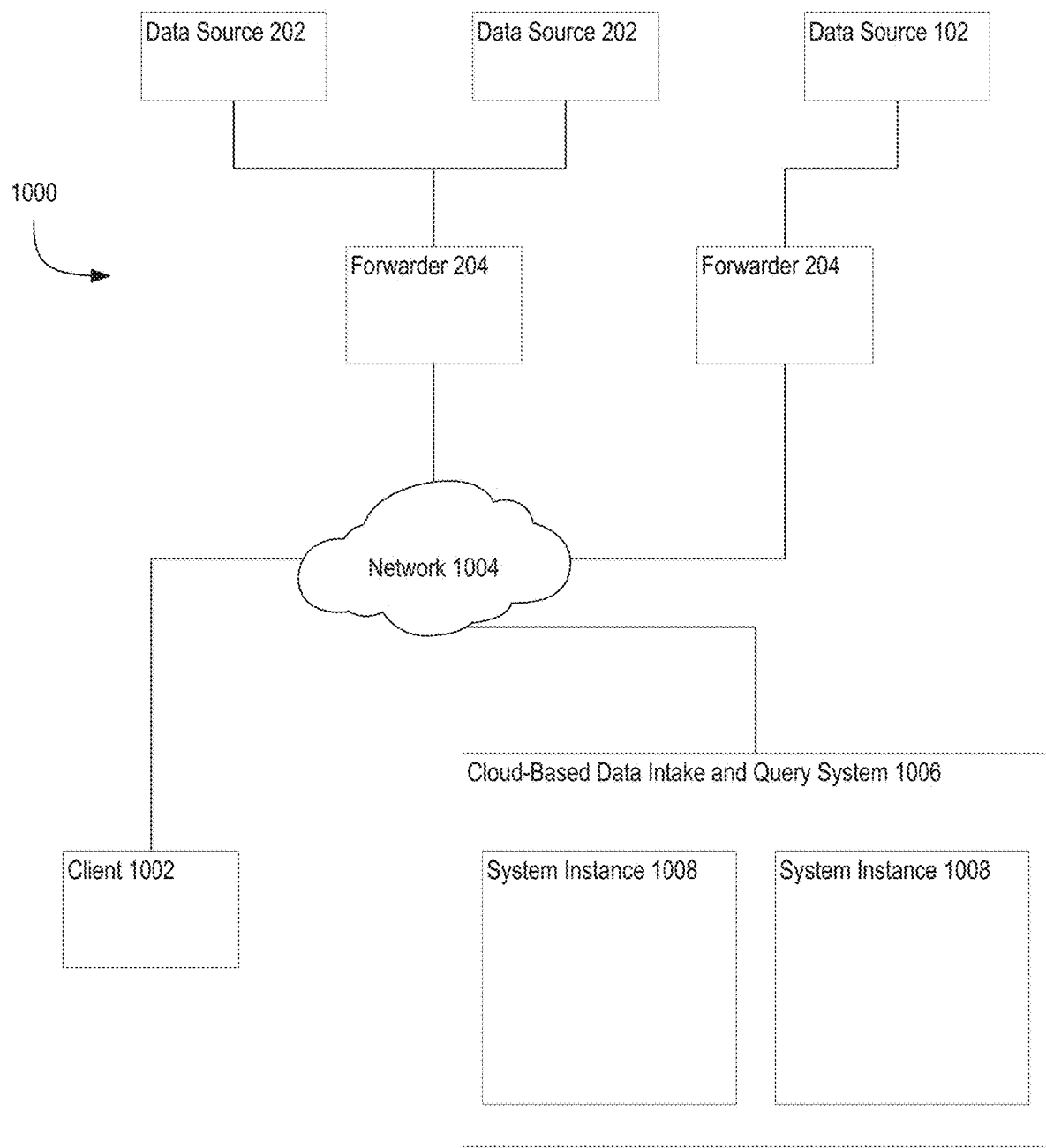
FIG. 10 illustrates a block diagram of an example cloud-based data intake and query system in which an embodiment may be implemented.

FIG. 10 illustrates a block diagram of an example cloud-based data intake and query system. Similar to the system of FIG. 2, the networked computer system 1000 includes input data sources 202 and forwarders 204. In the example system 1000, one or more forwarders 204 and client devices 1002 are coupled to a cloud-based data intake and query system 1006 via one or more networks 1004. Network 1004 broadly represents one or more LANs, WANs, cellular networks, intranetworks, internetworks, etc., using any of wired, wireless, terrestrial microwave, satellite links, etc., and may include the public Internet, and is used by client devices 1002 and forwarders 204 to access the system 1006. Similar to the system of 108, each of the forwarders 204 may be configured to receive data from an input source and to forward the data to other components of the system 1006 for further processing.

In an embodiment, a cloud-based data intake and query system 1006 may comprise a plurality of system instances 1008. In general, each system instance 1008 may include one or more computing resources managed by a provider of the cloud-based system 1006 made available to a particular subscriber. The computing resources comprising a system instance 1008 may, for example, include one or more servers or other devices configured to implement one or more forwarders, indexers, search heads, and other components of a data intake and query system, similar to system 108. As indicated above, a subscriber may use a web browser or other application of a client device 1002 to access a web portal or other interface that enables the subscriber to configure an instance 1008.

Providing a data intake and query system as described in reference to system 108 as a cloud-based service presents a number of challenges. Each of the components of a system 108 (e.g., forwarders, indexers and search heads) may at times refer to various configuration files stored locally at each component. These configuration files typically may involve some level of user configuration to accommodate particular types of data a user desires to analyze and to account for other user preferences. However, in a cloud-based service context, users typically may not have direct access to the underlying computing resources implementing the various system components (e.g., the computing resources comprising each system instance 1008) and may desire to make such configurations indirectly, for example, using one or more web-based interfaces. Thus, the techniques and systems described herein for providing user interfaces that enable a user to configure source type definitions are applicable to both on-premises and cloud-based service contexts, or some combination thereof.

2.14. Searching Externally Archived Data

Figure 11:
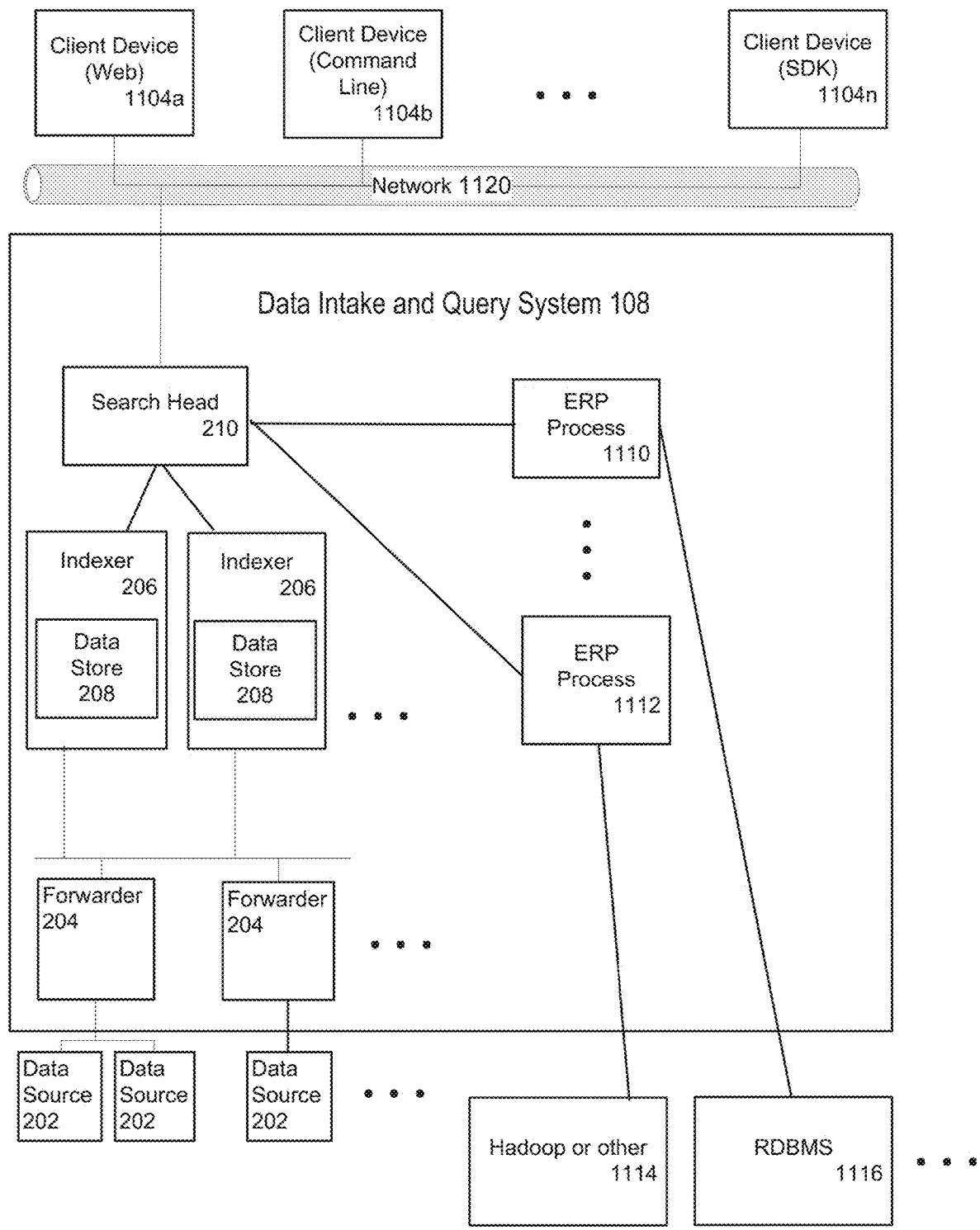
FIG. 11 illustrates a block diagram of an example search support system in accordance with the disclosed embodiments.

FIG. 11 shows a block diagram of an example of a data intake and query system 108 that provides transparent search facilities for data systems that are external to the data intake and query system. The search head 210 of the data intake and query system receives search requests from one or more client devices 1104 over network connections. As discussed above, the data intake and query system 108 may reside in an enterprise location, in the cloud, etc. FIG. 1 illustrates that multiple client devices 1104a, 1104b, . . . , 1104n may communicate with the data intake and query system 108. The client devices 104 may communicate with the data intake and query system using a variety of connections. For example, one client device in FIG. 1 is illustrated as communicating over an Internet (Web) protocol, another client device is illustrated as communicating via a command line interface, and another client device is illustrated as communicating via a system developer kit (SDK).

The search head 210 analyzes the received search request to identify request parameters. If a search request received from one of the client devices 1104 references an index maintained by the data intake and query system, then the search head 210 connects to one or more indexers 206 of the data intake and query system for the index referenced in the request parameters. That is, if the request parameters of the search request reference an index, then the search head accesses the data in the index via the indexer. The data intake and query system 108 may include one or more indexers 206, depending on system access resources and requirements. As described further below, the indexers 206 retrieve data from their respective local data stores 208 as specified in the search request. The indexers and their respective data stores that can comprise one or more storage devices and typically reside on the same system, though they may be connected via a local network connection.

If the request parameters of the received search request reference an external data collection, which is not accessible to the indexers 206 or under the management of the data intake and query system, then the search head 210 can access the external data collection through an External Result Provider (ERP) process 1110. An external data collection may be referred to as a "virtual index" (plural, "virtual indices"). An ERP process provides an interface through which the search head 210 may access virtual indices.

Thus, a search reference to an index of the system is understood to relate to a locally stored and managed data collection, but a search reference to a virtual index is understand to relate to an externally stored and managed data collection, which the search head may access through one or more ERP processes 1110, 1112. FIG. 11 shows two ERP processes 1110, 1112 that connect to respective remote (external) virtual indices, which are indicated as a Hadoop or other system 1114 (e.g., Amazon S3, Amazon EMR, other Hadoop Compatible File Systems (HCFS), etc.) and a relational database management system (RDBMS) 1116. Other virtual indices may include other file organizations and protocols, such as Structured Query Language (SQL) and the like. The ellipses between the ERP processes 1110, 1112 indicate optional additional ERP processes of the data intake and query system 108. An ERP process may be a computer process that is initiated or spawned by the search head 210 and is executed by the search data intake and query system 108. Alternatively or additionally, an ERP process may be a process spawned by the search head 210 on the same or different host system as the search head 210 resides.

The search head 210 may spawn a single ERP process in response to multiple virtual indexes referenced in a search request, or the search head may spawn different ERP processes for different virtual indices. Generally, virtual indices that share common data configurations or protocols may share ERP processes. For example, all search query references to a Hadoop file system may be processed by the same ERP process, if the ERP process is suitably configured. Likewise, all search query references to a SQL database may be processed by the same ERP process. In addition, the search head may provide a common ERP process for common external data source types (e.g., a common vendor may utilize a common ERP process, even if the vendor includes different data storage system types, such as Hadoop and SQL). Common indexing schemes also may be handled by common ERP processes, such as flat text files or Weblog files.

The search head 210 determines the number of ERP processes to be initiated via the use of configuration parameters that are included in a search request message. Generally, there is a one-to-many relationship between an external results provider "family" and ERP processes, and there is also a one-to-many relationship between an ERP process and corresponding virtual indexes that are referred to in a search request. For example, using RDBMS, assume two independent instances of such a system by one vendor, such as one RDBMS for production and another RDBMS used for development. In such a situation, it is likely preferable (but optional) to use two ERP processes, to maintain the independent operation as between production and development data, but both of the ERPs will belong to the same family, because the two RDBMS system types are from the same vendor.

The ERP process 1110, 1112 receives a search request from the search head 210. The search head may optimize the received search request for execution at the respective external virtual index. Alternatively, the ERP process may receive a search request as a result of analysis performed by the search head or by a different system process. The ERP process 1110, 1112 can communicate with the search head 210 via conventional input/output routines (e.g., standard in/standard out, etc.). In this way, the ERP process receives the search request from a client device such that the search request may be efficiently executed at the corresponding external virtual index.

The ERP process 11110, 112 may be implemented as a process of the data intake and query system. Each ERP process may be provided by the data intake and query system, or may be provided by process or application providers who are independent of the data intake and query system. Each respective ERP process may include an interface application installed at a computer of the external result provider that ensures proper communication between the search support system and the external result provider. The ERP processes 1110, 1112 generate appropriate search requests in the protocol and syntax of the respective virtual indices 1114, 1116 each of which corresponds to the search request received by the search support system 210. Upon receiving search results from their corresponding virtual indices, the respective ERP process passes the result to the search head 210, which may return or display the results or a processed set of results based on the returned results to the respective client device.

Client devices 1104 may communicate with the data intake and query system 108 through a network interface 1120, e.g., one or more LANs, WANs, cellular networks, intranetworks, and/or internetworks using any of wired, wireless, terrestrial microwave, satellite links, etc., and may include the public Internet. This is described in more detail in U.S. Pat. No. 8,738,629, entitled "EXTERNAL RESULT PROVIDED PROCESS FOR RETRIEVING DATA STORED USING A DIFFERENT CONFIGURATION OR PROTOCOL", issued on 27 May 2014, and which is hereby incorporated by reference in its entirety for all purposes.

2.14.1. ERP Process Features

The ERP processes described above may include two operation modes, a streaming mode, and a reporting mode. The ERP processes can operate in streaming mode only, or reporting mode only, or in both modes simultaneously. Operating in both modes simultaneously is referred to as mixed mode operation. Further, it will be appreciated that in mixed mode operation, the ERP at some point can stop providing the search head with streaming results and only provide reporting results thereafter, or the search head at some point may start ignoring streaming results it has been using and only use reporting results thereafter.

The streaming mode returns search results in real time with minimal processing, in response to the search request. The reporting mode provides results of a search request with processing of the search results prior to providing them to the requesting search head, which in turn provides results to the requesting client device. ERP operation with such multiple modes provides greater flexibility in the performance of the ERP process with regard to report time, search latency, and resource utilization.

In mixed mode operation, both streaming mode and reporting mode are operating simultaneously. The streaming mode results (e.g., the raw data obtained from the external data source) are provided to the search head, which can then process the results data (e.g., break the raw data into events, timestamp it, filter it, etc.) and integrate the results data with the results data from other external data sources, and/or from data stores of the search head. The search head performs such processing and can immediately start returning interim results to the user at the requesting client device, providing the streaming mode results, while the search head is simultaneously waiting for the ERP process to process the data it is retrieving from the external data source as a result of the concurrently executing reporting mode.

In some instances, the ERP process initially operates in a mixed mode, such that the streaming mode operates to enable the ERP quickly to return interim results (e.g., some of the raw or unprocessed data necessary to respond to a search request) to the search head, enabling the search head to process the interim results and start providing to the client or search requester interim results that are responsive to the query. Meanwhile, in this mixed mode, the ERP also operates concurrently in reporting mode, processing portions of raw data in a manner responsive to the search query. Upon determining that it has results from reporting mode available to return to the search head, the ERP may halt mixed mode at that time (or some later time) by stopping the return of data in streaming mode to the search head, switching to reporting mode only. The ERP at this point starts sending interim results in reporting mode to the search head, which in turn may then present this processed data responsive to the search request to the client or search requester. Typically the search head switches from using results from the ERP's streaming mode of operation to results from the ERP's reporting mode of operation at the point where the higher bandwidth results from the reporting mode outstrips the amount of data processed by the search head in the lower bandwidth streaming mode of ERP operation.

One reason reporting mode is typically higher bandwidth is because the ERP does not have to spend time transferring data to the search head for processing all the raw data, and another reason is because the ERP may optionally direct another processor to do the processing.

One should recognize that it is not necessary to halt at any point the streaming mode of operation to gain the higher bandwidth benefits of reporting mode; the search head could simply stop using the streaming mode results—and start using the reporting mode results—at some point at which the bandwidth of the reporting mode has caught up with or exceeded the amount of bandwidth provided by the streaming mode. Thus, a variety of triggers and ways to accomplish a switch from the search head using or the ERP transferring streaming mode results to reporting mode results may occur to one skilled in the art.

The reporting mode can involve the ERP process (or an external system) performing event breaking, time stamping, filtering of events to match the search query request, and calculating statistics on the results. Whether or not events are the ultimate answer to a search query, or whether or not statistics are the ultimate answer, depends on the search query request specified by the user. The user can request particular types of data, such as where the search query itself involves types of events, or the search request may ask for statistics on data, such as on events that meet the search request; either query phrasing is possible. In either case, the search head understands the query language used in the received query request, which may be a proprietary language. For example, the search head may understand the query language used by the assignee of the application, Splunk Inc. (a query language commonly called SPL, or Splunk Processing Language) and the search head typically understands how to use that language to obtain data from the indexers which store data in a Splunk-specific format.

The ERP processes support the search head, as the search head is not ordinarily configured to understand the format in which data is stored in external data sources such as Hadoop or SQL data systems. Rather, the ERP process performs that translation from the format for what has been requested by the search query that has been submitted in the search support system's native format (e.g., SPL if SPLUNK® ENTERPRISE is used as the search support system) to the format in which a search query request will be accepted by the corresponding external data system. The external data systems typically store data in a different format from that of the search support system's native index format, and utilize a different query language (e.g., SQL or MapReduce, rather than SPL or the like).

As noted, the ERP process can operate in the streaming mode alone. After the ERP process has performed the translation of the query request referred to above, and once the ERP process has returned the raw results from the streaming mode, the search head can operate on the returned data and can integrate the returned data with any data obtained from local data sources (e.g., native to the search support system) and from other external data sources and from other ERP processes (if such operations were required to satisfy the terms of the search query). Thus, one advantage of mixed mode operation is that, in addition to streaming mode, the ERP process is also executing concurrently in the reporting mode, so that the ERP process (rather than the search head) is processing query results (e.g., performing event breaking, timestamping, filtering, possibly calculating statistics if required to be responsive to the search query request, etc.). It should be apparent that additional time is needed for the ERP process to perform the processing in such a configuration. Therefore, the streaming mode will allow the search head to start returning interim results to the user at the client device before the ERP process can complete sufficient processing to start returning any search results. The switchover between streaming and reporting mode happens when the ERP process determines that the switchover is appropriate, such as when the ERP process determines it can start returning meaningful results from its reporting mode.

The operation described above illustrates the source of operational latency: streaming mode has low latency (one obtains immediate results) and usually has relatively low bandwidth (fewer results can be returned per unit of time), whereas the concurrently running reporting mode has relatively high latency (it has to perform a lot more processing before returning any of the results) and usually has relatively high bandwidth (more results can be processed per unit of time). For example, when the ERP process does start returning report results, it returns a more (processed) results than in the streaming mode, because, e.g., statistics only need to be calculated to be responsive to the search request. That is, the ERP process doesn't have to take time to first return raw data to the search head. As noted, the ERP process could be configured to operate in streaming mode alone and return just the raw data for the search head to process in a way that is responsive to the search request (which may have requested certain types of events, or statistics on those events). Alternatively, the ERP process can be configured to operate in the reporting mode only. Also alternatively, the ERP process can be configured to operate in streaming mode and reporting mode concurrently, as described, with the ERP process stopping the transmission of streaming results to the search head when the concurrently running reporting mode has caught up and started providing results. The reporting mode does not require the processing of all raw data that is responsive to the search query request before the ERP process starts returning results, rather, the reporting mode usually performs processing of chunks of events at a time and returns the processing results to the search head for each chunk.

For example, an ERP process can be configured to perform as simply as returning the contents of a search result file verbatim, with little or no processing of results, such that a search head performs all processing such as parsing byte streams into events, filtering, and the like, or the ERP process can be configured to perform more flexibly, such as analyzing the search request and handling all the computation that a native search indexer process would otherwise perform. In this way, the configured ERP process provides greater flexibility in features while operating according to desired preferences in terms of response latency and resource requirements.

2.15. Typical Hardware Components

Figure 12:
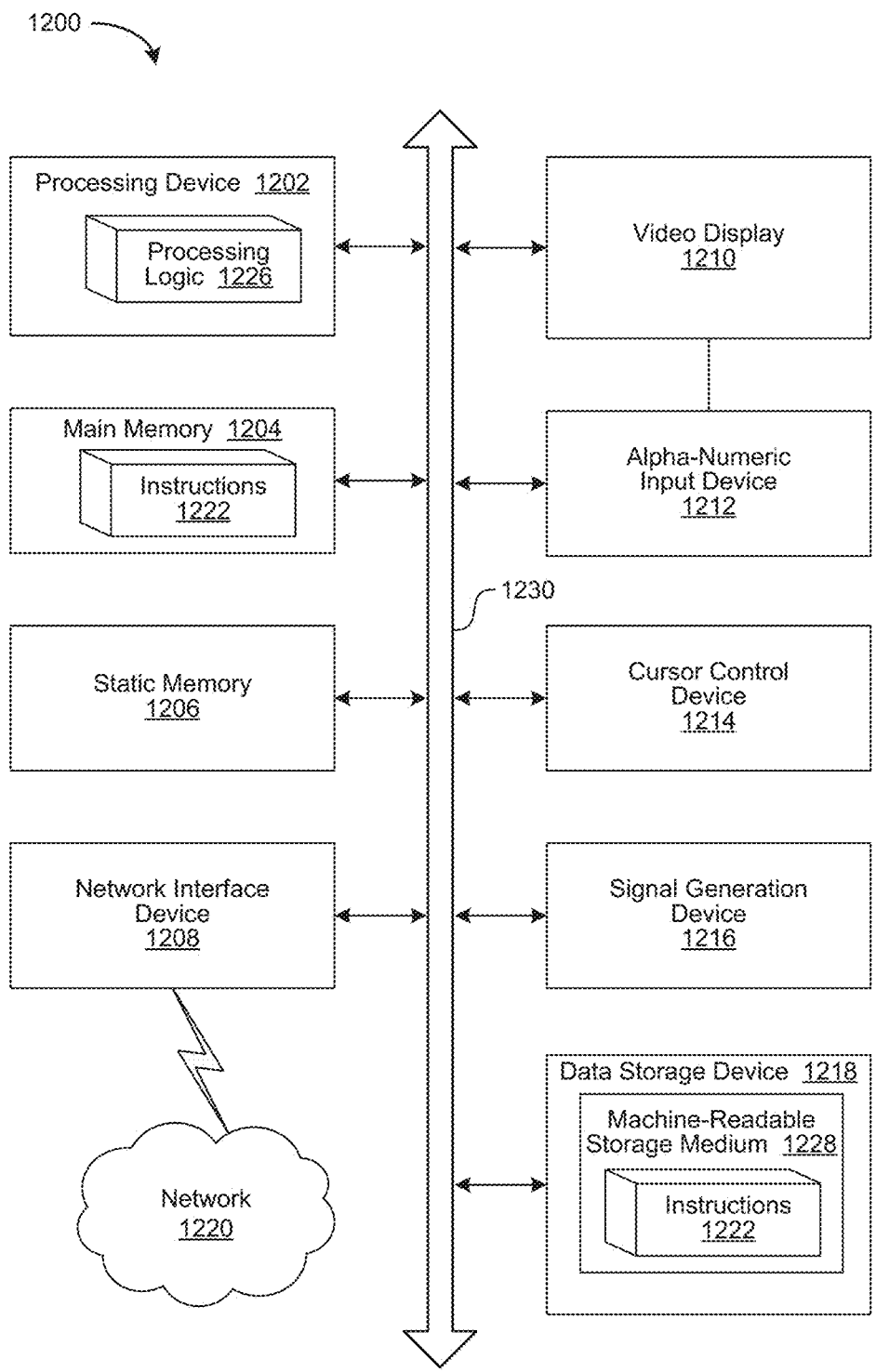
FIG. 12 illustrates a diagrammatic representation of a machine in the exemplary form of a computer system 1200 within which a set of instructions, for causing the machine to perform any one or more of the methodologies discussed herein, may be executed.

FIG. 12 illustrates a diagrammatic representation of a machine in the exemplary form of a computer system 1200 within which a set of instructions, for causing the machine to perform any one or more of the methodologies discussed herein, may be executed. The system 1200 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, mobile phones, personal digital assistants, televisions, cameras, automobile computers, electronic media players, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 1200 may represent system 700 of FIG. 7.

The exemplary computer system 1200 includes a processing device (processor) 1202, a main memory 1204 (e.g., read-only memory (ROM), flash memory, dynamic random access memory (DRAM) such as synchronous DRAM (SDRAM)), a static memory 1206 (e.g., flash memory, static random access memory (SRAM)), and a data storage device 1218, which communicate with each other via a bus 1230.

Processing device 1202 represents one or more general-purpose processing devices such as a microprocessor, central processing unit, or the like. More particularly, the processing device 1202 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1202 may also be one or more special-purpose processing devices such as an application specific integrated circuit (ASIC), a field programmable gate array (FPGA), a digital signal processor (DSP), network processor, or the like. The processing device 1202 is configured to execute the notification manager 210 for performing the operations and blocks discussed herein.

The computer system 1200 may further include a network interface device 1408 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), and a signal generation device 1216 (e.g., a speaker).

The data storage device 1218 may include a computer-readable medium 1228 on which is stored one or more sets of instructions 1222 (e.g., instructions for search term generation) embodying any one or more of the methodologies or functions described herein. The instructions 1222 may also reside, completely or at least partially, within the main memory 1204 and/or within processing logic 1226 of the processing device 1202 during execution thereof by the computer system 1200, the main memory 1204 and the processing device 1202 also constituting computer-readable media. The instructions may further be transmitted or received over a network 1220 via the network interface device 1208.

While the computer-readable storage medium 1228 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

3.0. Defining Event Subtypes

Figure 22:
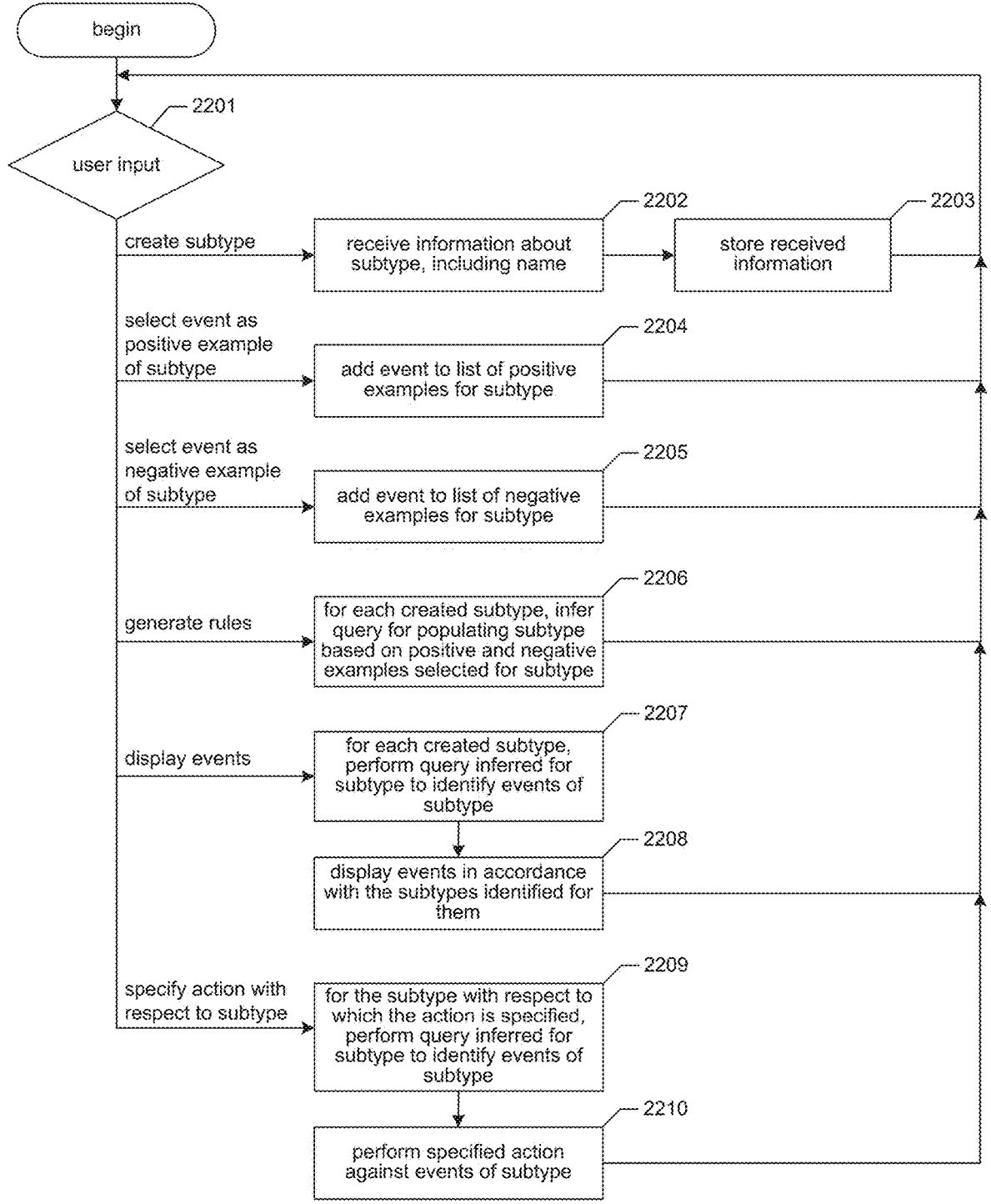
FIG. 22 is a flow diagram showing a process typically performed by the facility in some embodiments to present versions of a visual user interface described herein.
Figure 23:
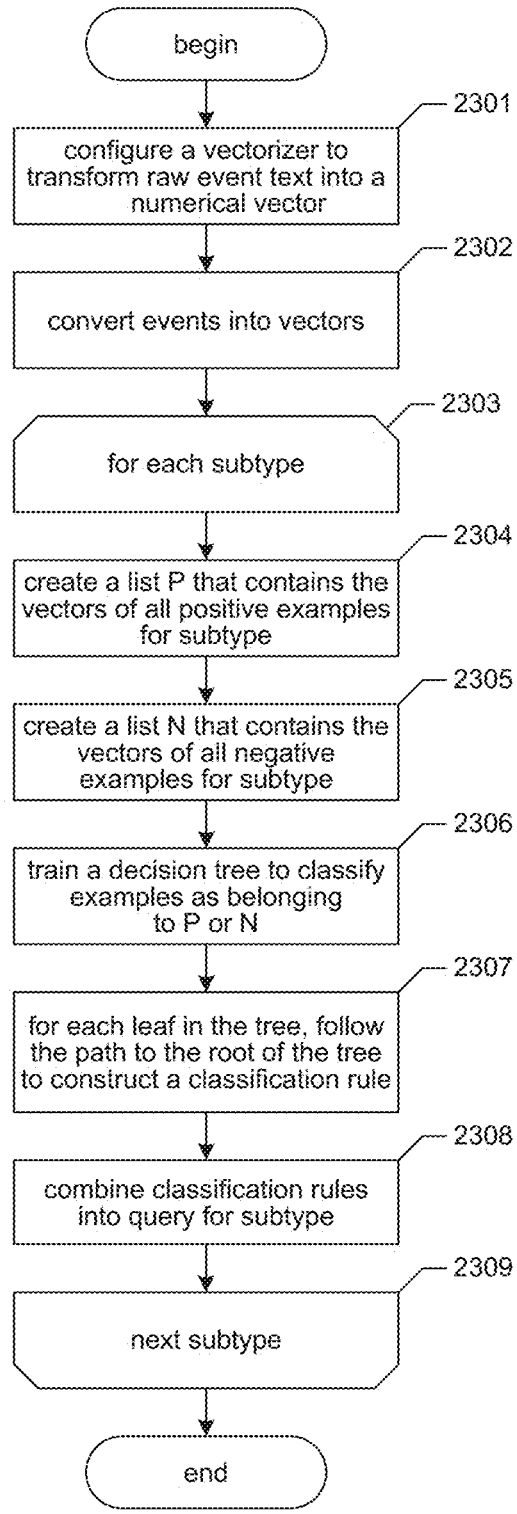
FIG. 23 is a flow diagram showing a process typically performed by the facility in some embodiments to infer queries for populating the event subtypes.

FIGS. 13-21 show a visual user interface presented in some embodiments to define event subtypes using examples. FIGS. 22-23 which follow show the logic employed by the facility in some embodiments to provide such a visual user interface.

Figure 13:
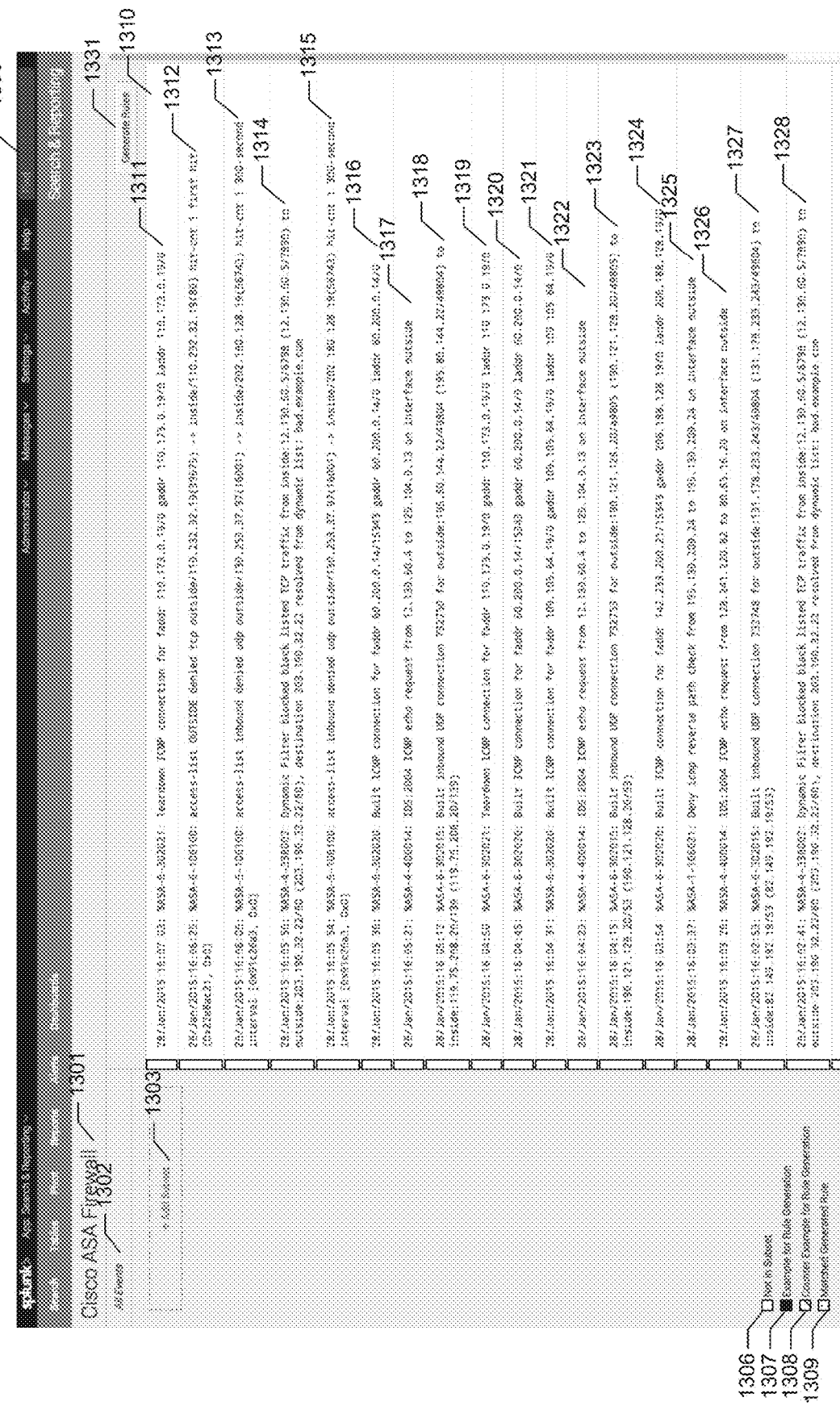
FIG. 13 shows the visual user interface in a first state.

FIG. 13 shows the visual user interface in a first state. The visual user interface 1300 includes an indication 1301 of an event source whose events are being displayed—a network security appliance called a Cisco Adaptive Security Appliance firewall. The display also includes an indication 1302 that all of the events received from this event source are being displayed. The display further includes a list of displayed events 1310. This list of events includes events 1311-1328. In some embodiments, each event has at least a time stamp indicating the time to which it relates, a host name identifying a network host to which it relates, a source type, and a source. None of events 1311-1328 are presently included in any subtype, as can be seen by comparing the contents of the status bar segments to their left to pattern/color key 1306-1309. The display also includes an add subset control 1303 that the user can select in order to create subtypes into which to classify events.

Figure 14:
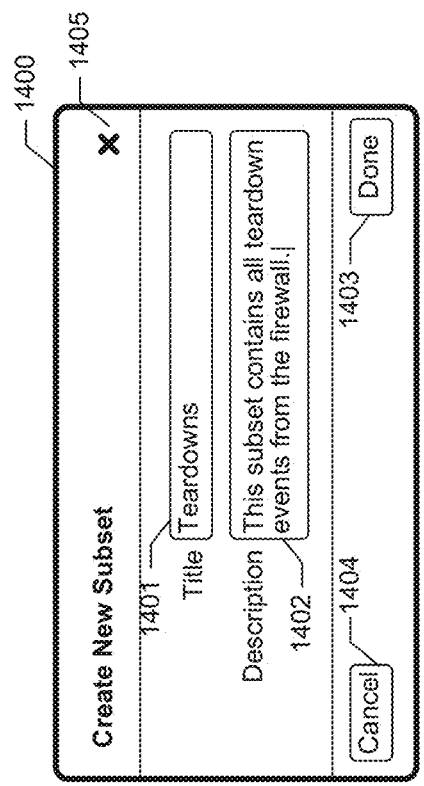
FIG. 14 is a display diagram showing the result of selecting the add subset control shown in FIG. 13.

FIG. 14 is a display diagram showing the result of selecting the add subset control shown in FIG. 13. A dialog box 1400 contains a field 1401 into which the user can enter the name of the new subtype. The new subtype here is "Teardowns," which are events that reflect the termination of an ICMP network connection The dialog box further includes a field 1402 into which the user can enter a description of the subtype created, and a control 1403 that the user can select in order to complete creation of the subtype. The user may also select control 1404 or control 1405 to cancel creation of a subtype.

Figure 15:
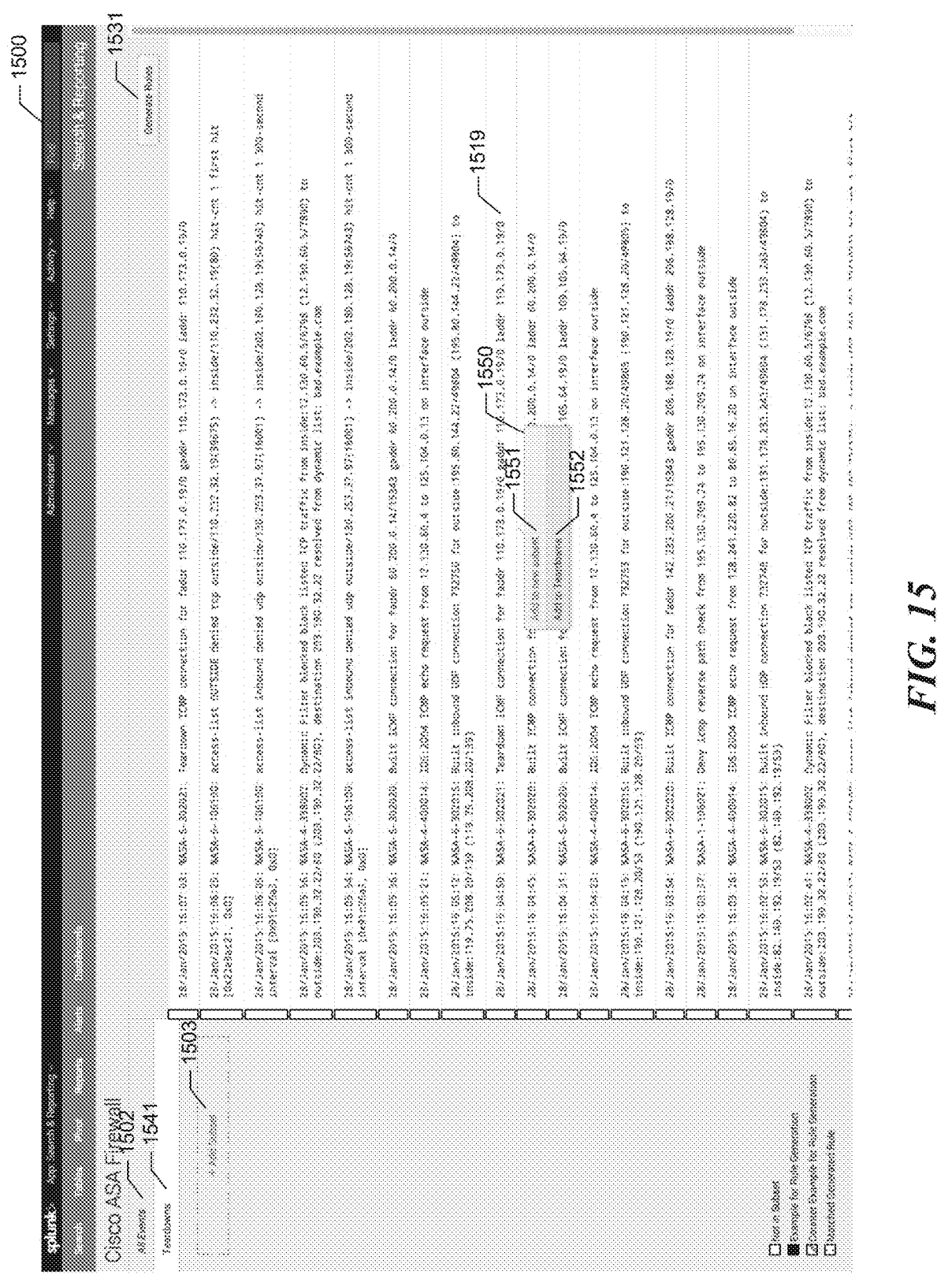

FIG. 15 shows a display presented by the facility in response to creation of a new subtype as shown in FIG. 14. The display 1500 includes a new indication 1541 corresponding to the Teardowns subtype just created. Among indications 1502 and 1541, the shading around indication 1502 indicates that indication 1502 is selected, such that all events are displayed in the event list. When the user selects event 1519, such as by clicking on any part of this event, the facility displays context menu 1550. In the context menu, the user can select an Add to Teardowns indication 1552 in order to add event 1519 as a positive example of the Teardowns subtype. The user may also select an Add to new subtype indication 1551 in order to both create a new subtype and add event 1519 as an example of that subtype.

Figure 16:
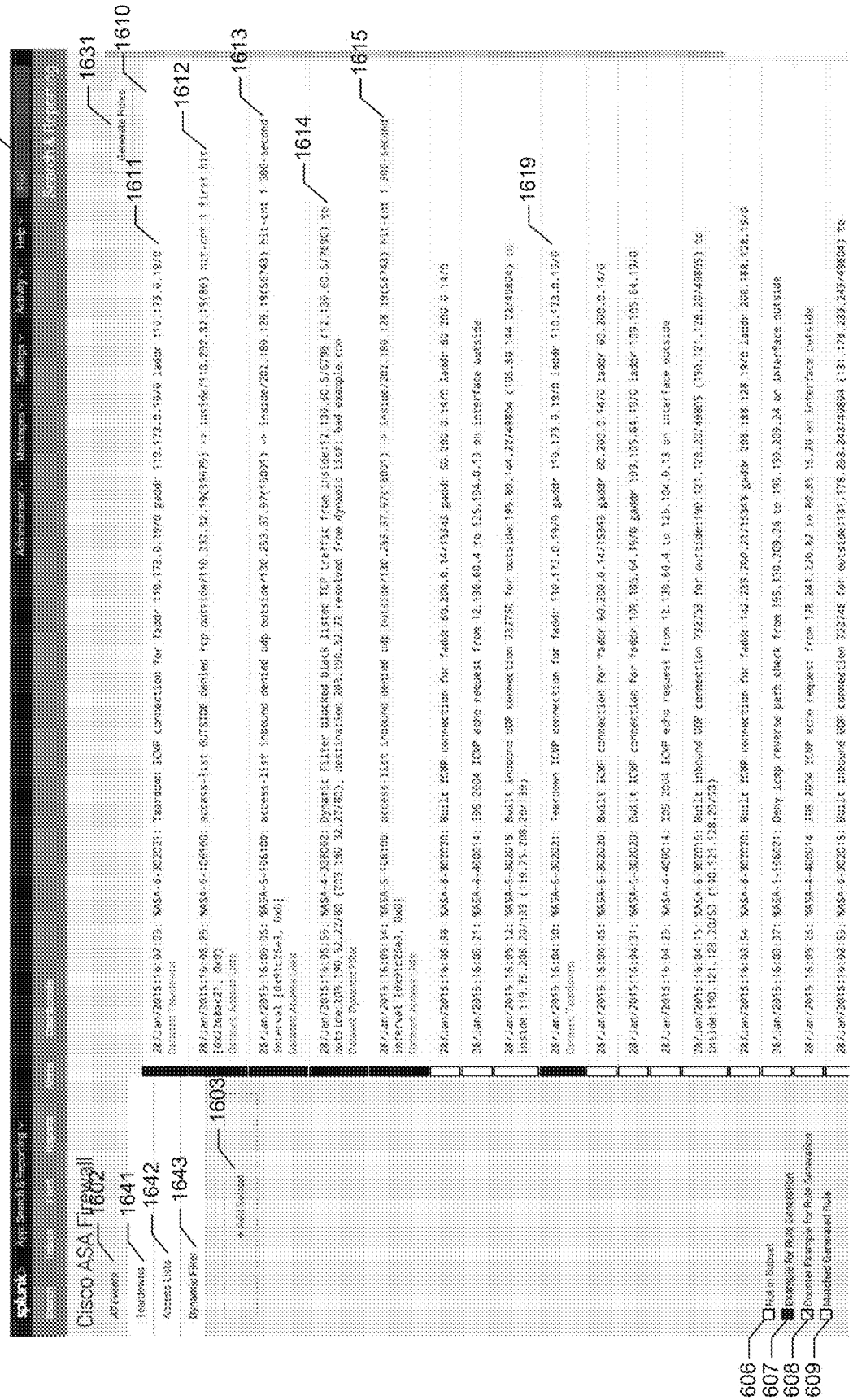
FIG. 16 shows the result of selecting several events as examples of different subtypes.

FIG. 16 shows the result of selecting several events as examples of different subtypes. In addition to the Teardowns subtype, the user has also created an Access List subtype 1642, and a Dynamic Filter subtype 1643. As shown by the pattern in the status bars to the left of the events, the user has added each of events 1611-1615 and 1619 as an example of some type subtype. In particular: as can be seen from the text "Dataset: Teardowns" added to events 1611 and 1619, the user has added these events as positive examples of the Teardowns subtype; as can be seen from the text "Dataset: Access Lists" added to events 1612, 1613, and 1615, the user has added these events as positive examples of the Access Lists subtype; and it can be seen from the text "Dataset: Dynamic Filter" added to event 1614, the user has added this event as a positive example of the Dynamic Filter subtype. In various embodiments, the user can use various techniques to create the new subtypes such as: by selecting the add subtype control 1603; by selecting the "add to new subset" indication in a context menu with respect to a certain event; etc. In various embodiments, the user can use various techniques to select particular events as examples for a particular subtype, such as by selecting an add to subset indication from a context menu for an event; clicking and dragging one or more events to a particular subtype indication; confirming an event found to match the subtype's population query; etc.

In order to display events in a subtype, the user can select the indication of that subtype. For example, to show only the events in the Teardowns subtype, the user selects indication 1641 for the Teardowns subtype.

Figure 17:
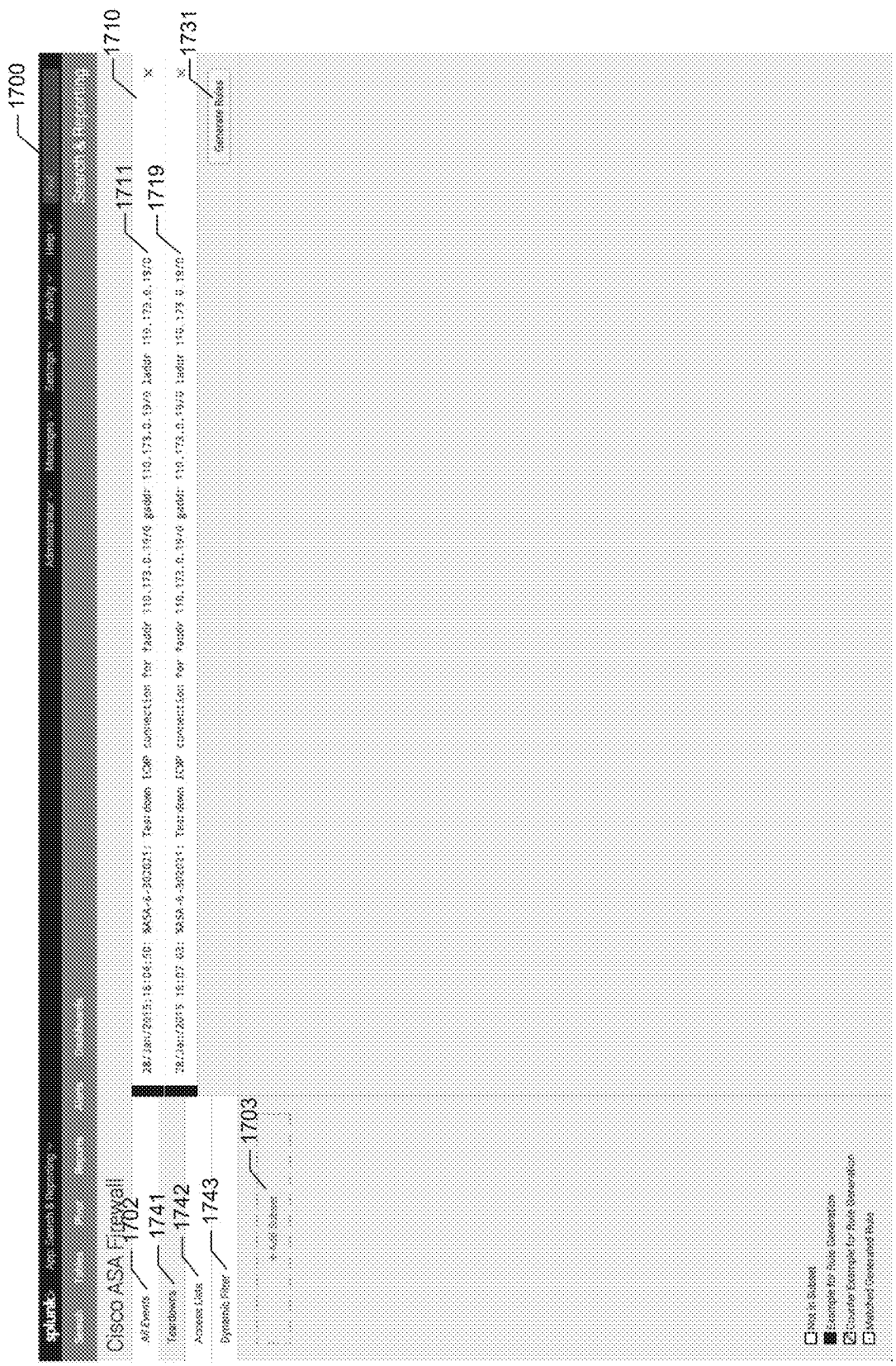
FIG. 17 shows the result of selecting the Indication 1641 for the Teardowns subtype.

FIG. 17 shows the result of selecting the Indication 1641 for the Teardowns subtype. First, the gray bar surrounding the Teardowns subtype indication 1741 shows that it is selected. Further, list 1710 of events contains only events 1711 and 1719—the two events explicitly selected by the user as positive examples of the Teardowns subtype. Once the user has selected a number of examples for a subtype, the user can select a Generate Rules control 1731 in order to cause the facility to infer a query for use in populating the Teardowns subtype. The particular ways in which the facility infers and applies a query in some embodiments are discussed in greater detail below in connection with blocks 2206, 2207, and 2209 of FIG. 22, and in connection with the blocks of FIG. 23. The facility will perform the inferred query against the list of all events, and identify as belonging to the subtype those events that match the query.

Figure 18:
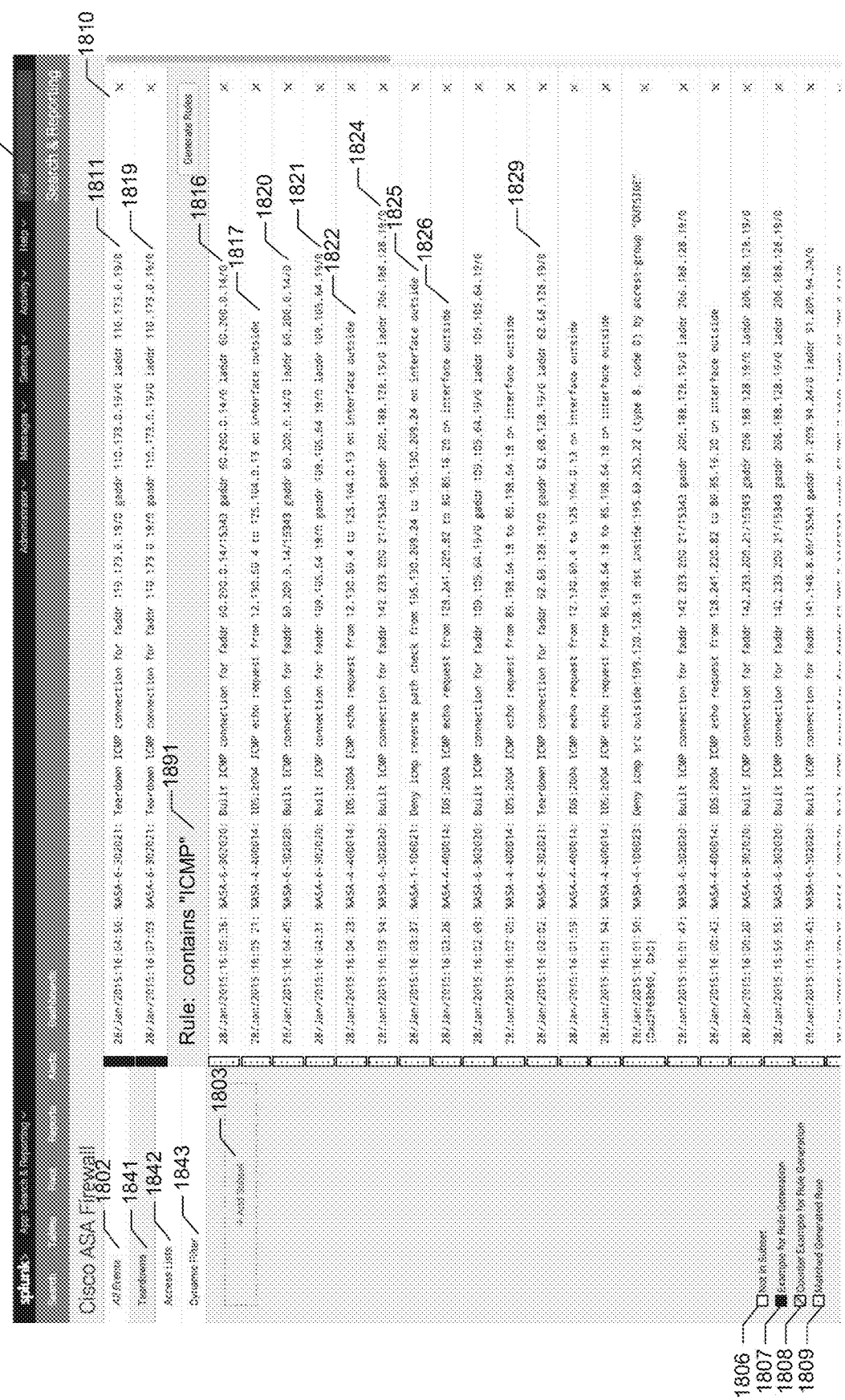
FIG. 18 shows the result of selecting the Generate Rules control.

FIG. 18 shows the result of selecting the Generate Rules control. In response, as shown in indication 1891, the facility has inferred the following query for populating the Teardowns subtype:

ICMP

Using this query, the facility has identified a number of the events in the original list as qualifying for the Teardowns subtype, based upon the fact that these events contain the keyword "ICMP." These are shown in the list of events 1810 with status bars visually reflecting the 1809 status for events that match a generated rule. These include events 1816, 1817, 1820, 1821, 1822, 1824, 1825, and 1826, among others. While it can be seen that some of the events that match the query, such as event 1829, belong in the Teardowns subtype, many of the events shown to match the inferred query do not properly fit in the Teardowns subtype. For example, event 1816 fails to properly fit in the Teardowns subtype because it reflects creation of an ICMP network connection rather than the termination of such a connection. After recognizing this, the user can improve the effectiveness of the inferred query by adding further positive and/or negative examples of the Teardowns subtype.

Figure 19:
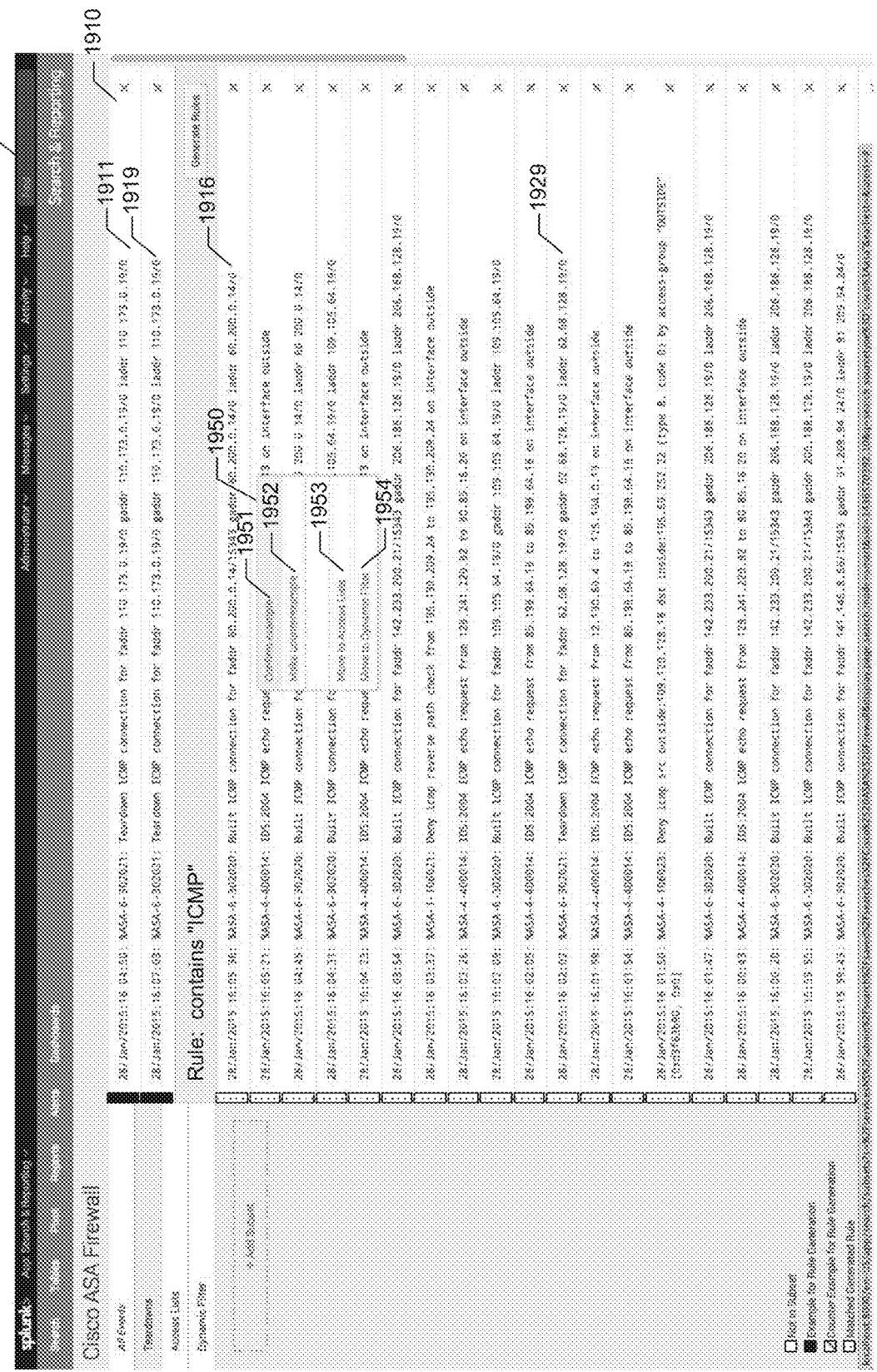
FIG. 19 shows a context menu displayed when the user selects one of the matching events.

FIG. 19 shows a context menu displayed when the user selects one of the matching events. In response to the user's selection of event matching event 1916, the facility displays context menu 1950. The context menu includes: indication 1951 for confirming event 1916 as a positive example; indication 1952 for selecting event 1916 as an event that should not be in the Teardowns subtype; and indications 1953 and 1954 for moving event 1916 to be a positive example of the Access Lists or Dynamic Filter subtypes, respectively. In some embodiments, when an event is moved to a different subtype, it is established as a negative example of the subtype from which it is moved.

Figure 20:
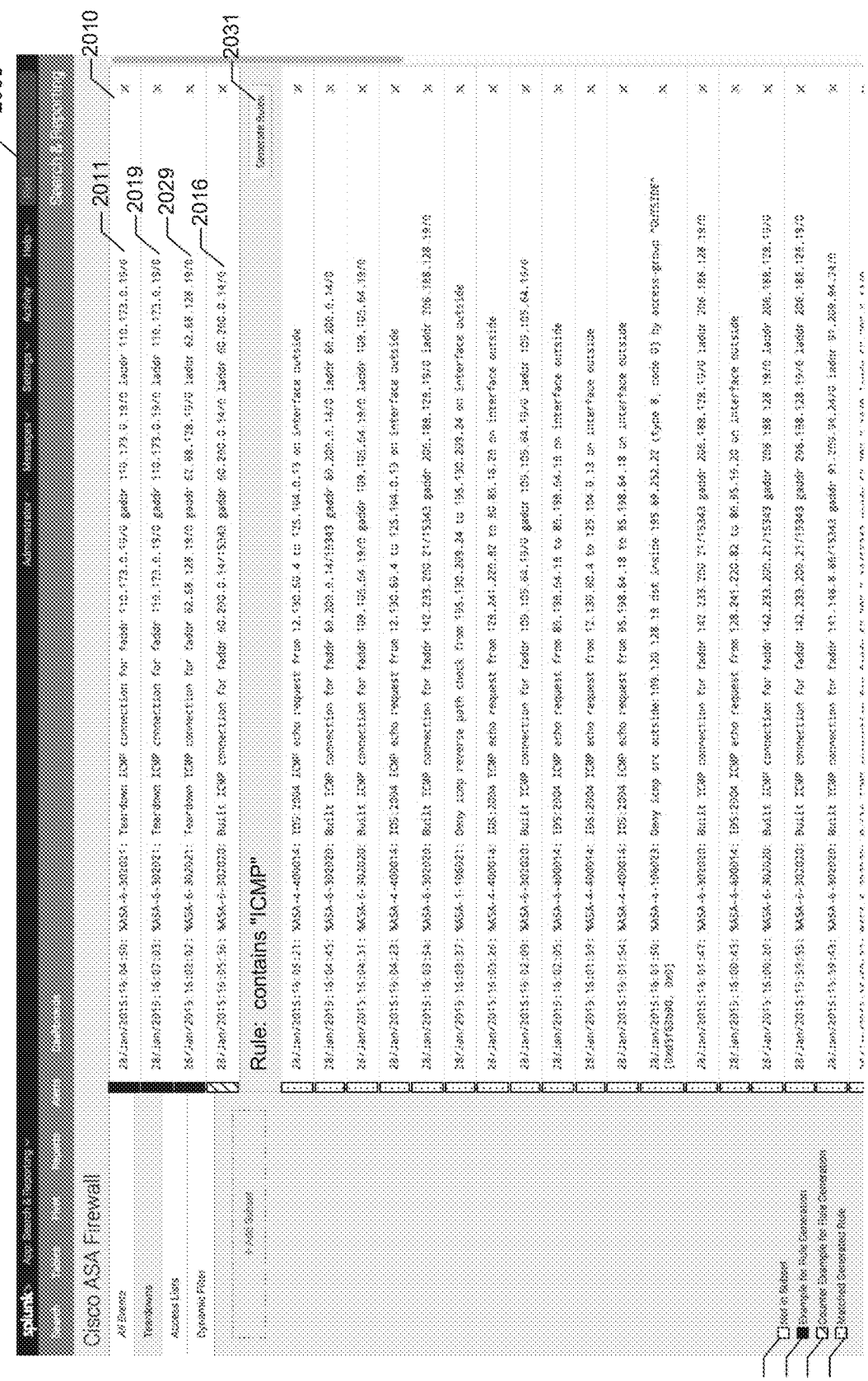
FIG. 20 shows extension by the user of the set of examples selected for the Teardowns subtype.

FIG. 20 shows extension by the user of the set of examples selected for the Teardowns subtype. It can be seen by comparing the pattern in the status indicators for events 2011, 2019, 2029, and 2016 that, in addition to events 2011 and 2019 that were earlier identified by the user as positive examples of the Teardowns subtype, the user has further identified event 2029 as a positive example of the Teardowns subtype. The user has also identified event 2016 as a negative example of the Teardowns subtype. The user can now again select the Generate Rules control 2031 to infer a new search query for populating the Teardowns subtype. In some embodiments (not shown), rather than displaying positive and negative examples of a subtype in the same list of events, the facility displays the positive and negative examples in separate lists of events.

Figure 21:
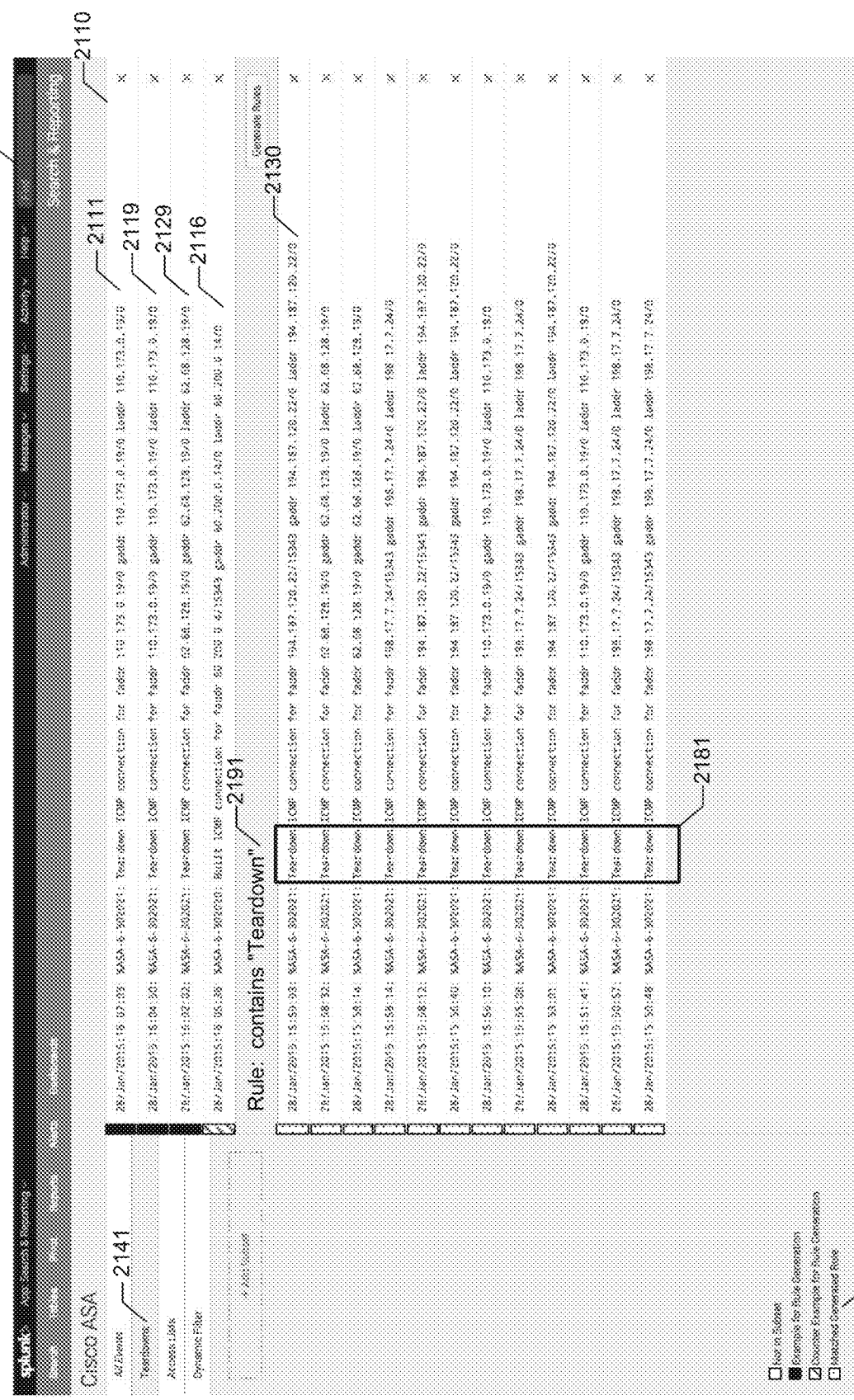
FIG. 21 shows the result of selecting the Generate Rules control in the context of a longer list of examples.

FIG. 21 shows the result of selecting the Generate Rules control in the context of a longer list of examples. In this case, as shown in indication 2191, the new search query for populating the Teardown subtype based upon the expanded set of examples is:

Teardown

It can be seen that, using this new query, the list of events matching this new query—those events having pattern 2109 in their status bar—such as event 2130 all properly fit into the Teardown subtype because they all contain the keyword "Teardown" 2181.

FIG. 22 is a flow diagram showing a process typically performed by the facility in some embodiments to present versions of the visual user interface described herein. At block 2201, the facility branches based on the type of user input received. If the user input is user input for creating a new subtype, then the facility continues at block 2202. If the user input is user input for selecting an event as a positive example of a subtype, then the facility continues at block 2204. If the user input is user input for selecting an event as a negative example of a subtype, then the facility continues at block 2205. If the user input is user input for generating new rules, then the facility continues at block 2206. If the user input is user input for displaying a list of events, then the facility continues at block 2207. Finally, if the user input is user input specifying an action with respect to a subtype, then the facility continues at block 2209.

At block 2202, where the user input is user input for creating a new subtype, the facility receives information about the subtype, including its name, as shown, for example in FIG. 14. At block 2203, the facility stores the information received at block 2202. After block 2203, the facility continues at block 2201 to process the next user input.

At block 2204, where the user input is user input for selecting an event as a positive example of a subtype, the facility adds the selected event to a list of positive examples for that subtype. The facility uses the events on this list as a basis for inferring a query for populating this subtype. After block 2204, the facility continues at block 2201.

At block 2205, where the user input is user input for selecting an event as a negative example of the subtype, the facility adds the event to a list of negative examples it maintains for the subtype. The facility uses the events on this list as a basis for inferring a query for populating this subtype. After block 2205, the facility continues at block 2201.

In some embodiments (not shown), the facility has branches that parallel the branches containing blocks 2204 and 2205 for removing events from the list of positive and negative examples, respectively, of a subtype in response to corresponding user input.

At block 2206, where the user input is user input instructing the facility to generate rules, the facility proceeds as follows: for each created subtype, the facility infers a query for populating the subtype based upon the positive and negative examples selected for the subtype at blocks 2204 and 2205. In various embodiments, the query inferred by the facility: specifies keywords or other strings that must be present in an event to match; specifies an order in which keywords or other strings must be present in an event to match; specifies keywords or other strings that must not be present in an event to match; specifies field values that must be present in an event to match; specifies field values that must not be present in an event to match; specifies number/value ranges that must be present in an event to match; specifies punctuation or white space content or patterns that must be present in an event to match; specifies a pattern that must match contents of the event; specifies a regular expression that must match contents of the event; etc. In some embodiments, the query can employ field values that are based on lookups or other computations. In some embodiments, the query applies a vectorizer to field values and tests for the presence of keywords or other strings. In some embodiments, the four vector rising field values, the query performs various processing such as converting all text to lowercase, removing all numerals, performing spellchecking, etc. In various embodiments, the facility uses various machine learning, statistical modeling, and/or artificial intelligence techniques to infer these queries. In some embodiments, the facility attempts to identify text or other contents common to the positive example events that are not present in, or otherwise best distinguish them from, the negative example events. In some embodiments, the facility uses a decision tree as a basis for generating the inferred queries. Additional details of step 2206 are discussed below in connection with FIG. 23.

In some embodiments (not shown), rather than soliciting from the user an explicit instruction to generate subtype population rules for a subtype, the facility performs such generation automatically in response to each change by the user to the lists of positive and negative examples, or once adequate lists of positive and negative examples have been compiled. In some such embodiments, the facility seeks confirmation from the user that the subset is properly defined.

At block 2207, where the user input is user input instructing the facility to display events, the facility proceeds as follows: for each created subtype, the facility performs the query inferred for the subtype to identify the events belonging to the subtype. In some embodiments, certain events can satisfy more than one such query, causing those events to be present in each of the corresponding subtypes. At block 2208, the facility displays the events in accordance with the subtypes identified for them. In some embodiments, block 2208 includes, for a list of events filtered to a particular subtype, displaying only the events in that subtype. In some embodiments, block 2208 involves displaying events spanning two or more subtypes, including visual indications of any subtypes of which each displayed event is a member. Those skilled in the art will appreciate that various other ways of displaying events in accordance with their subtypes may be substituted. After block 2208, the facility continues at block 2201.

At block 2209, where the user input specifies an action with respect to a subtype, the facility proceeds as follows:

for each created subtype, the facility performs the query inferred for the subtype at block 2206 to identify the events of the subtype. At block 2210, the facility performs the specified action against the events of the subtype for which the action was specified. For example, the user input may specify the application of additional processing to members of a particular subtype, such as evaluating a regular expression with respect to these events; running an extraction rule against these events; etc. After block 2210, the facility continues at block 2201.

FIG. 23 is a flow diagram showing a process typically performed by the facility in some embodiments to infer queries for populating the event subtypes. In some embodiments, the facility performs the process shown in FIG. 23 as part of performing step 2206 shown in FIG. 22. At block 2301, the facility configures a vectorizer to transform raw event text into a numerical vector. In some embodiments, in block 2301, the facility uses a CountVectorizer provided as part of the scikit-learn machine learning system described at scikit-learn.org/stable/modules/generated/sklearn.feature_extraction.text. CountVectorizer.html. At block 2302, the facility uses the vectorizer configured in block 2301 to convert events into vectors. In blocks 2303-2308, the facility loops through each subtype. At block 2304, the facility creates a list P containing the vectors representing all of the events that are positive examples for the current subtype. At block 2305, the facility creates a list N that contains the vectors representing all of the events that are negative examples for the current subtype. In some embodiments, the list N created in block 2305 also includes the vectors corresponding to any event that is a positive example for any other subtype. At block 2306, the facility trains a decision tree to classify examples as belonging either to the list P or the list N. In some embodiments, in block 2306, the facility uses the DecisionTreeClassifier provided as part of the scikit-learn machine learning system, described at scikit-learn.org/stable/modules/generated/sklearn.tree.DecisionTreeClassifier.html. In the decision tree created in block 2306, each split of a parent node into its child nodes corresponds to the presence or absence of a token sequence (an n-gram) observed by the CountVectorizer configured in block 2301. Each leaf of the decision tree corresponds to whether or not an event belongs to the subtype. At block 2307, for each leaf of the decision tree trained in block 2306, the facility follows the leaf-to-root path to construct a classification rule that can be used as part of a query to populate the subtype, such as by requiring that the matching events contain a first term and do not contain a second term. At block 2308, the facility constructs the query inferred for the subtype from one or more of the classification rules constructed in block 2307. At block 2309, if additional subtypes remain to be processed, then the facility continues at block 2303 to process the next subtype, else this process concludes.

In some embodiments, the facility saves event subtypes persistently, enabling them to be applied to any group of events at any time in the future. In some embodiments, this involves persistently storing metadata of the subtype, such as its name and description, and at least the latest query generated for populating the subtype. In some embodiments, this further involves persistently storing additional information, such as positive and negative examples selected for the subtype, the most recent decision tree constructed for the subtype, the most recent result of applying the query to populate the subtype, etc. In some embodiments, the subtype's metadata includes an identification of one or more event sources and/or one or more event sourcetypes with which the subtype is associated, and to whose events the subtype is to be applied. In some such embodiments, this identifying information is among the subtype metadata that is stored persistently.

Figure 24:
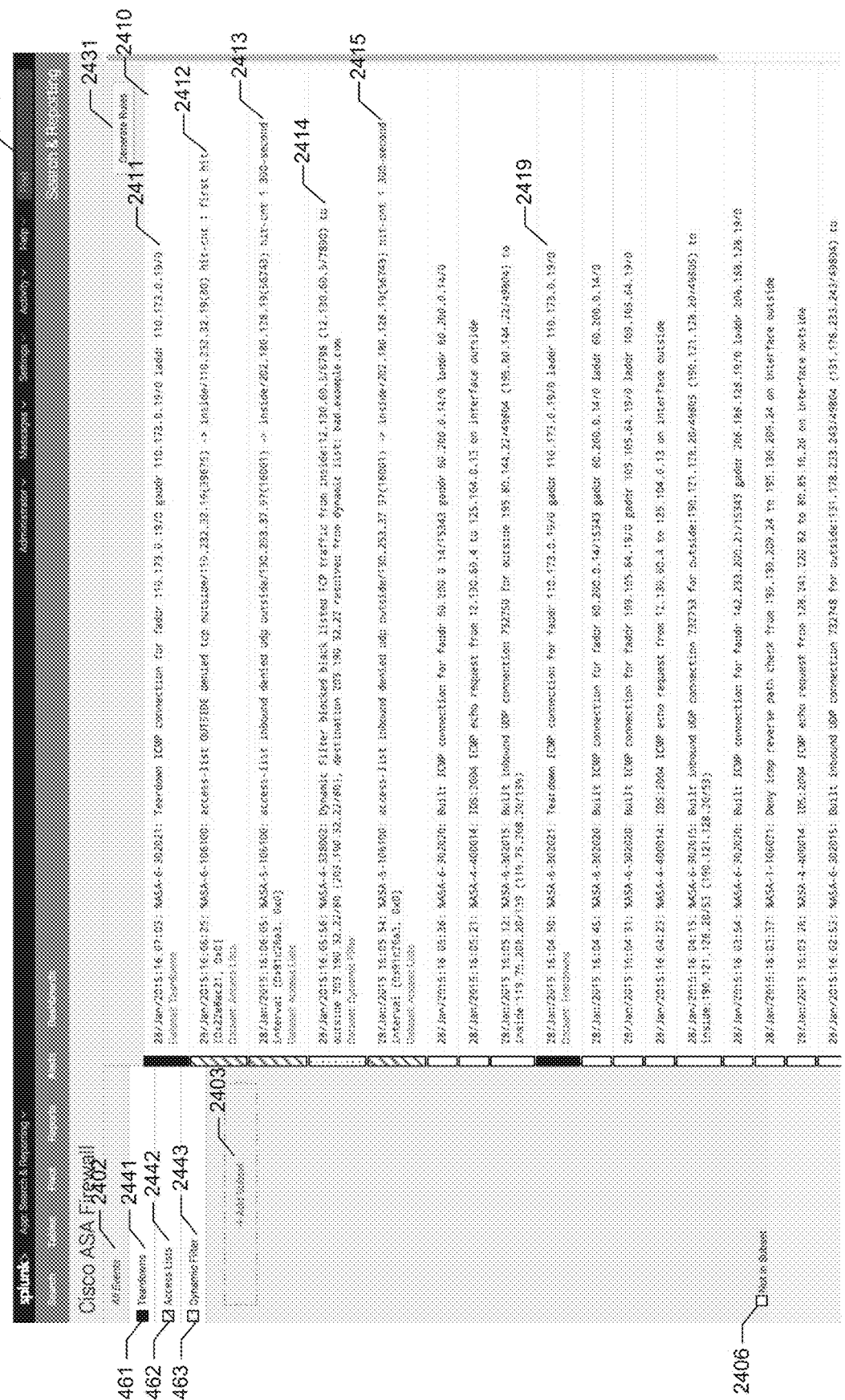
FIG. 24 is a display diagram in which color and/or pattern coding is used to identify the subtype to which events correspond.

In some embodiments, the facility identifies, in a list of events, which events belong to which subtypes using color and/or pattern coding. FIG. 24 is a display diagram in which color and/or pattern coding is used to identify the subtype to which events correspond. It can be seen in display 2400 that a different pattern 2461-2463 is identified for each of the subtypes. For example, the pattern 2462 is identified for the Access Lists subtype 1642. It can further be seen that the bars to the left of each event in event list 2410 correspond to this key. For example, it can be seen that events 1612, 1613, and 1615 each are members of the Access Lists subtype. Those skilled in the art will appreciate that various patterns and/or colors can be visually associated with events in different ways, such as being present adjacent to each event in various shapes, being used to fill a rectangle or other space containing the text of the event, etc.

It will be appreciated by those skilled in the art that the above-described facility may be straightforwardly adapted or extended in various ways. While the foregoing description makes reference to particular embodiments, the scope of the invention is defined solely by the claims that follow and the elements recited therein.

We claim:

1. A method performed in a computing system having a processor and a memory, comprising:

causing to be displayed individually a plurality of events identified among machine-generated data;

receiving first user input, responsive to a display of the plurality of events, naming an event subtype to be created;

receiving second user input selecting one or more of the plurality of events as positive examples to be included as members of the named event subtype, the second user input specifying at least a portion of a display of individual ones of said one or more of the plurality of events, the second user input directly selecting said one or more of the plurality of events;

generating a rule for identifying events that qualify as members of the named event subtype, wherein the rule includes search criteria based on the positive examples selected;

applying the rule to the plurality of events to qualify one or more events, of the plurality of events, that satisfy the search criteria of the rule, as members of the named event subtype; and causing the one or more events qualified by application of the rule to be displayed so as to indicate that the one or more events qualified by application of the rule correspond to the named event subtype.

2. The method of claim 1, further comprising:

applying the rule to additional events identified among machine-generated data; and causing qualified additional events to be displayed together with the one or more events qualified by application of the rule to the plurality of events.

3. The method of claim 1 wherein the plurality of events are of a selected source type, the method further comprising, in response to identification of additional events among machine-generated data, the additional events being of the selected source type:

applying the rule to the additional events; and causing qualified additional events to be displayed together with the events qualified by application of the rule to the plurality of events.

4. The method of claim 1, further comprising:

storing the generated rule for application to events identified among machine-generated data at a time later than the storing.

5. The method of claim 1, further comprising:

receiving user input selecting one or more of the plurality of events as negative examples to be excluded as members of the named event subtype.

6. The method of claim 1, further comprising:

receiving user input selecting one or more of the plurality of events as negative examples of the named event subtype, wherein the rule is generated based on both the positive examples and the negative examples of the named event subtype.

7. The method of claim 1, further comprising:

receiving user input selecting one or more of the plurality of events as negative examples of the named event subtype; and constructing a classifying decision tree representing the positive examples of the named event subtype and the negative examples of the named event subtype, and wherein the generating generates the rule using the classifying decision tree.

8. The method of claim 1 wherein each of the plurality of events comprises:

a timestamp associated with raw data.

9. The method of claim 1, further comprising, after causing the qualified events to be displayed:

receiving user input selecting one or more additional events as positive examples of the named event subtype; and in response to receiving the selection of additional events:

generating a second rule having search criteria based on the positive examples selected;

applying the second rule to the plurality of events to qualify as members of the named event subtype a new set of events that satisfy the search criteria of the second rule; and causing the new set of events to be displayed.

10. The method of claim 1, further comprising:

performing an extraction rule against the qualified events, to the exclusion of events of the plurality not qualified.

11. The method of claim 1, further comprising:

performing a search against the qualified events, to the exclusion of events of the plurality not qualified.

12. The method of claim 1, further comprising:

causing the events selected as positive examples to be displayed in a first manner, and wherein causing the events to be displayed by application of the rule causes the qualified events to be displayed in a second manner, the second manner being visually distinct from the first manner.

13. The method of claim 1, further comprising:

causing the events selected as positive examples to be displayed in connection with a first color, and wherein causing the events to be displayed by application of the rule causes the qualified events to be displayed in connection with a second color, the second color being visually distinct from the first color.

14. The method of claim 1, further comprising:

performing the method for each of a plurality of named event subtypes;

and wherein, for each of the plurality of named event subtypes, causing the events qualified as members of the named event subtype to be displayed in a different manner than events qualified as members of other named event subtypes of the plurality of named event subtypes.

15. The method of claim 1, further comprising:

performing the method for each of a plurality of named event subtypes, and wherein, for each of the plurality of named event subtypes, causing the events qualified as members of the named event subtype to be displayed in connection with a different color than events qualified as members of other named event subtypes of the plurality of named event subtypes.

16. The method of claim 1, further comprising:

receiving user input confirming a qualified event as belonging to the named event subtype.

17. The method of claim 1, further comprising:

receiving user input rejecting a qualified event as belonging to the named event subtype.

18. The method of claim 1 wherein the search criteria for the rule comprises one or more required keywords.

19. The method of claim 1 wherein the search criteria for the rule comprises one or more forbidden keywords.

20. The method of claim 1 wherein the search criteria for the rule comprises one or more field/value pairs.

21. The method of claim 1 wherein the search criteria for the rule comprises one or more regular expressions.

22. The method of claim 1 wherein the search criteria for the rule comprises one or more punctuation patterns.

23. The method of claim 1 wherein the search criteria for the rule comprises one or more whitespace patterns.

24. The method of claim 1 wherein the rule is generated automatically in response to receiving a name for an event type.

25. The method of claim 1 wherein the rule is generated automatically in response to receiving user input representing activation of a user interface control.

26. The method of claim 1 wherein the received user input corresponds to dragging the selected events to a display region allocated to positive examples.

27. The method of claim 1, further comprising causing to be displayed visual indications of a plurality of event subtypes including the named event subtype, wherein the received user input corresponds to dragging the selected events to the displayed visual indication of the named event subtype.

28. The method of claim 1 wherein the received user input corresponds to selection of an add to examples action from a context menu displayed in connection with a selected event.

29. A non-transitory computer-readable medium having contents that, when executed in a computing system having a processor and a memory, cause the computing system to:

cause to be displayed individually a plurality of events identified among machine-generated data;

receive first user input, responsive to a display of the plurality of events, naming an event subtype to be created;

receive second user input selecting one or more of the plurality of events as positive examples to be included as members of the named event subtype, the second user input specifying at least a portion of a display of individual ones of said one or more of the plurality of events, the second user input directly selecting said one or more of the plurality of events;

generate a rule for identifying events that qualify as members of the named event subtype, wherein the rule includes search criteria based on the positive examples selected;

apply the rule to the plurality of events to qualify one or more events, of the plurality of events, that satisfy the search criteria of the rule, as members of the named event subtype; and cause the one or more events qualified by application of the rule to be displayed so as to indicate that the one or more events qualified by application of the rule correspond to the named event subtype.

30. A computing system having a processor and a memory, comprising:

an output subsystem configured to cause display individually of a plurality of events identified among machine-generated data;

an input subsystem configured to receive first user input, responsive to a display of the plurality of events, selecting a name of an event subtype to be created, and second user input selecting one or more of the plurality of events as positive examples to be included as members of the named event subtype, the second user input specifying at least a portion of a display of individual ones of said one or more of the plurality of events, the second user input directly selecting said one or more of the plurality of events;

a rule generation subsystem configured to generate, based on the positive examples selected by the user input received by the input subsystem, a rule for identifying events that qualify as members of the named event subtype, wherein the rule includes search criteria;

a rule application subsystem configured to apply the rule generated by the rule generation subsystem to the plurality of events to qualify one or more events, of the plurality of events, that satisfy the search criteria of the rule, as members of the named event subtype;

wherein the output subsystem is further configured to cause display of the one or more events qualified by application of the rule, so as to indicate that the one or more events qualified by application of the rule correspond to the named event subtype.

* * * * *